United States Patent
Crill et al.

(10) Patent No.: US 6,445,822 B1
(45) Date of Patent: Sep. 3, 2002

(54) SEARCH METHOD AND APPARATUS FOR LOCATING DIGITALLY STORED CONTENT, SUCH AS VISUAL IMAGES, MUSIC AND SOUNDS, TEXT, OR SOFTWARE, IN STORAGE DEVICES ON A COMPUTER NETWORK

(75) Inventors: Rikk Crill, Longmont; David Bruce; Kevin Schehrer, both of Boulder, all of CO (US)

(73) Assignee: Look Dynamics, Inc., Longmont, CO (US)

( * ) Notice: Subject to any disclaimer, the term of this patent is extended or adjusted under 35 U.S.C. 154(b) by 0 days.

(21) Appl. No.: 09/326,362

(22) Filed: Jun. 4, 1999

(51) Int. Cl.[7] .................................................. G06K 9/68

(52) U.S. Cl. ...................................... 382/218; 382/211

(58) Field of Search ................................ 382/218, 219, 382/217, 216, 280, 156, 210, 211; 701/212, 213, 214, 217; 707/513, 514; 349/116

(56) References Cited

U.S. PATENT DOCUMENTS

| | | | |
|---|---|---|---|
| 4,513,441 A | 4/1985 | Henshaw | 382/43 |
| 4,672,683 A | 6/1987 | Matsueda | 382/57 |
| 4,950,050 A | 8/1990 | Pernick et al. | 350/162.13 |
| 4,980,922 A | 12/1990 | Leib | 382/31 |
| 5,119,443 A | 6/1992 | Javidi et al. | 382/42 |
| 5,148,522 A | 9/1992 | Okazaki | 395/161 |
| 5,173,954 A | 12/1992 | Kato et al. | 382/65 |
| 5,220,622 A | 6/1993 | Scarr | 382/31 |
| 5,257,322 A * | 10/1993 | Matsuoka et al. | 382/211 |
| 5,267,332 A * | 11/1993 | Walch et al. | 382/198 |
| 5,309,522 A | 5/1994 | Dye | 382/41 |
| 5,323,472 A | 6/1994 | Falk | 382/31 |
| 5,327,286 A | 7/1994 | Sampsell et al. | 359/561 |
| 5,418,380 A * | 5/1995 | Simon et al. | 250/550 |
| 5,515,453 A * | 5/1996 | Hennessey et al. | 382/141 |
| 5,579,471 A | 11/1996 | Barber et al. | 395/326 |
| 5,581,383 A * | 12/1996 | Reichel et al. | 349/116 |
| 5,699,449 A * | 12/1997 | Javidi | 382/156 |
| 5,729,704 A | 3/1998 | Stone et al. | 395/346 |
| 5,761,330 A | 6/1998 | Stoianov et al. | 382/127 |
| 5,815,598 A | 9/1998 | Hara et al. | 382/211 |
| 5,841,907 A | 11/1998 | Javidi et al. | 382/210 |
| 5,893,095 A | 4/1999 | Jain et al. | 707/6 |
| 5,991,781 A * | 11/1999 | Nielsen | 707/513 |
| 6,131,067 A * | 10/2000 | Girerd et al. | 701/213 |

FOREIGN PATENT DOCUMENTS

| | | | | |
|---|---|---|---|---|
| EP | 05 16106 | 12/1992 | | 9/74 |
| GB | 2 312 535 | 10/1997 | | 17/60 |
| WO | WO 9 834 180 | 8/1998 | | 17/30 |

OTHER PUBLICATIONS

Kozaitis, Multiresolution Wavelet Processing For Binary Phase–Only Filters, Photonic Component Engineering and Applications, Orlando, Florida, Apr. 8–9, 1996; Proceedings of the SPIE, 1996, vol. 2749, pp. 165–174.

(List continued on next page.)

*Primary Examiner*—Andrew W. Johns
*Assistant Examiner*—Seyed Azarian
(74) *Attorney, Agent, or Firm*—James R. Young; Faegre & Benson

(57) ABSTRACT

A method for searching for and comparing images includes allowing a user, software application, computer system, etc., to create, identify, select, provide, or otherwise produce one or more reference images that the user, software application, computer system, etc., wants to search for, retrieving or providing one or more candidate images that are to be compared to the reference images, comparing one or more of the candidate images with one or more of the reference images, and indicating the results of the comparisons and the degree of correlation or matching between one or more of the candidate images and one or more of the reference images.

66 Claims, 15 Drawing Sheets

OTHER PUBLICATIONS

Mitkas, P.; Berra, P.; Guilfoyle, P.; "An Optical System for Full Text Search", Proceedings of the International Conference on Research and Development in Information Retrieval, Jun. 25, 1989, vol. 12, pp. 98–107.

Yeun, J.; Kim, N.; "Design of Optimal Multiplexed Filter and an Analysis on the Similar Discrimination for Music Notations Recognition" (Abstract), Institute of Electrical Engineers, GB, Inspec. No. 5728120, Jun. 1997.

Hey, R.; Noharet, B.; Sjöberg, H.; "Internet Remote–Controlled Optical Correlator Based on 256×256 FLC Spatial Light Modulators", Journal of Optics A: Pure and Applied Optics, Mar. 1999, IOP Publishing, UK, vol. 1, No. 2, pp. 307–309.

"Photo Search Fight Continues," *The Search Engine Report*, Dec. 3, 1998.

"Alta Vista Photo Finder Has Artists Concerned," *The Search Engine Report*, Nov. 4, 1998.

* cited by examiner

SEARCH METHOD AND APPARATUS FOR LOCATING DIGITALLY STORED CONTENT, SUCH AS VISUAL IMAGES, MUSIC AND SOUNDS, TEXT, OR SOFTWARE, IN STORAGE DEVICES ON A COMPUTER NETWORK

BACKGROUND OF THE INVENTION

1. Field of the Invention

The present invention is directed to a method and apparatus for searching and comparing images and, more specifically, to a method and apparatus for comparing one or more reference images with one or more locally or remotely located candidate images.

2. Description of the Prior Art

The growth of computer networks and increases in computer processing capabilities has lead to the development of many databases or repositories of digitized or electronic images and graphics. The growing areas of multimedia, animation, special effects, etc. use digitized or electronic images or graphics. Storing or creating such images in a digital or electronic format, i.e., as a series of zeros and ones, allows such files to be easily stored, communicated, manipulated, and reproduced as needed by the applications.

Many companies use or develop databases of images or graphic files. Such databases may be centrally or remotely located. For example, a company may keep or maintain a database of schematics or other images relating to the manufacture, assembly, and maintenance of products the company develops and sells. As another example, a company may store pictures or images of artwork, posters, paintings, antiques, real property, etc. that the company has available for sale or rent. Such databases of images are often searched periodically by people who are looking for a specific image or who are attempting to find matches between an image they may create or provide and images in the database. A user may access the database servers from a computer, terminal, or other client device, which can be locally or directly connected to the database servers or which can be remotely connected to the database servers via a local or wide area computer or other communications network. Often times, however, limitations on the ability to quickly search through the image databases or to efficiently compare images provided by the user to images in the image databases significantly reduce the utility of the image databases.

The growth of the Internet and the World Wide Web has created a proliferation of web sites accessible by a user with a browser-enabled computer, terminal, or other client device. The Internet and the World Wide Web act as a large and continuously expanding depository or distributed database of image files. Unfortunately, the rapid growth of the Internet and the World Wide Web has also lead to the unauthorized and illegal use, copying, manipulation, modification, and distribution of many images and has increased the ability to pirate software files, music sound files, text files, and other digital or electronic files and images.

Once a database or depository of images is created, it is often desirable to search the database for a specific image or to compare images in the database, referred to here as candidate images, with other images provided by a user, device, software application, etc., often referred to as reference images. The candidate images may be located centrally in one or more image databases. Alternatively, the images might be stored in a distributed manner, such as on numerous web sites connected to the World Wide Web. Regardless of how or where the candidate images are located or stored, the user desires to locate such candidate images and compare them to the reference images provided by the user.

A person or company concerned that its software files, music or sound files, text files, and other digital or electronic files or images have been illegally used or posted on one or more web sites might want to search the World Wide Web for such illegally used or posted or copied files and the web sites on which they are posted or stored. For example, the Walt Disney Company might be concerned that images of cartoon characters it owns, such as Donald Duck or Mickey Mouse, have been used or posted on a web site without permission. Therefore, the Walt Disney Company might want to search the World Wide Web looking for such images. Another company, such as the Microsoft Corporation, concerned that one of its software programs has been illegally copied onto a web site accessible via the World Wide Web, might want to search the World Wide Web looking for illegally posted copies of the software program.

Unfortunately, comparing two images or two digital files can be a very time consuming process. Therefore, despite the state of the art in image and pattern recognition, there remains a need for an efficient apparatus and method to search for one or more candidate images and to compare such candidate images to one or more reference images. Preferably, the image comparison will recognize and find patterns present in candidate images regardless of the scale, shape, rotation, or translation of the patterns in the candidate images. In addition, the apparatus and method will preferably allow candidate images to be retrieved from centralized and/or distributed databases or repositories of images for comparison to reference images.

SUMMARY OF THE INVENTION

Accordingly, it is an object of the present invention to provide a method and apparatus for searching for and comparing images.

Another object of the present invention is to provide a method and apparatus for comparing reference images and candidate images.

A further object of the present invention is to provide a method and apparatus for comparing images stored in one or more centralized or distributed databases of images with one or more reference images created, selected, identified, or otherwise provided by a user or client device.

Yet another object of the present invention is to provide a method and apparatus for the efficient comparison of sound and music files, software files, text files, graphic files, and other images.

Still another object of the present invention is to provide a method and apparatus for searching for and finding pirated, illegal, or otherwise unauthorized copies of sound and music files, software files, text files, graphic files, and other images.

A still further object of the present invention is to provide a method and apparatus for searching for images having selected or desirable textures, colors, shapes, sizes, etc.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a method for enabling a user to compare one or more images includes producing one or more reference images; producing one or more candidate images; comparing one or more of the reference images with one or more of the candidate images using optical correlation; and providing results of the comparison to the user.

To further achieve the foregoing and other objects and in accordance with the purposes of the present invention, as embodied and broadly described herein, a method for enabling a user to search for one or more images that may be stored in or on one or more web sites includes producing one or more reference images; searching one or more of the web sites to find one or more candidate images; retrieving or downloading one or more of the candidate images from one or more of the web sites; and comparing one or more candidate images with one or more reference images.

Also to achieve the foregoing and other objects and in accordance with the purposes of the present invention, as embodied and broadly described herein, an apparatus for enabling a user to compare one or more images includes means for producing one or more reference images; means for producing one or more candidate images; optical correlation means for comparing one or more of the reference images with one or more of the candidate images; and means for providing results of the comparison to the user.

Also to achieve the foregoing and other objects and in accordance with the purposes of the present invention, as embodied and broadly described herein, an article of manufacture includes a computer usable medium having a computer readable program code means embodied therein for comparing images, the computer readable program code means in said article of manufacture including means for producing one or more reference images; means for producing one or more candidate images; means for comparing one or more of the reference images with one or more of the candidate images; and means for providing results of the comparison to the user.

Also to achieve the foregoing and other objects and in accordance with the purposes of the present invention, as embodied and broadly described herein, a program storage device readable by a machine, tangibly embodying a program of instructions executable by the machine to perform a method for comparing images, the method including producing one or more reference images; producing one or more candidate images; comparing one or more of the reference images with one or more of the candidate images using optical correlation; and providing results of the comparison to the user.

Also to achieve the foregoing and other objects and in accordance with the purposes of the present invention, as embodied and broadly described herein, a method for enabling a user or device to compare one or more images includes producing a reference image; producing a candidate image; creating a lower resolution version of said reference image; creating a lower resolution version of said candidate image; and comparing said lower resolution version of said reference image to said lower resolution version of said candidate image.

Also to achieve the foregoing and other objects and in accordance with the purposes of the present invention, as embodied and broadly described herein, an apparatus for enabling a user to search for one or more images that may be stored in or on one or more web sites includes means for producing one or more reference images; means for searching one or more of the web sites to find one or more candidate images; means for retrieving or downloading one or more of said candidate images from one or more of the web sites; and means for comparing one or more candidate images with one or more reference images.

Also to achieve the foregoing and other objects and in accordance with the purposes of the present invention, as embodied and broadly described herein, an apparatus for enabling a user or device to compare one or more images includes means for producing a reference image; means for producing a candidate image; means for creating a lower resolution version of said reference image; means for creating a lower resolution version of said candidate image; and means for comparing said lower resolution version of said reference image to said lower resolution version of said candidate image.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

DETAILED DESCRIPTION OF THE PREFERRED EMBODIMENTS

Figure 1:
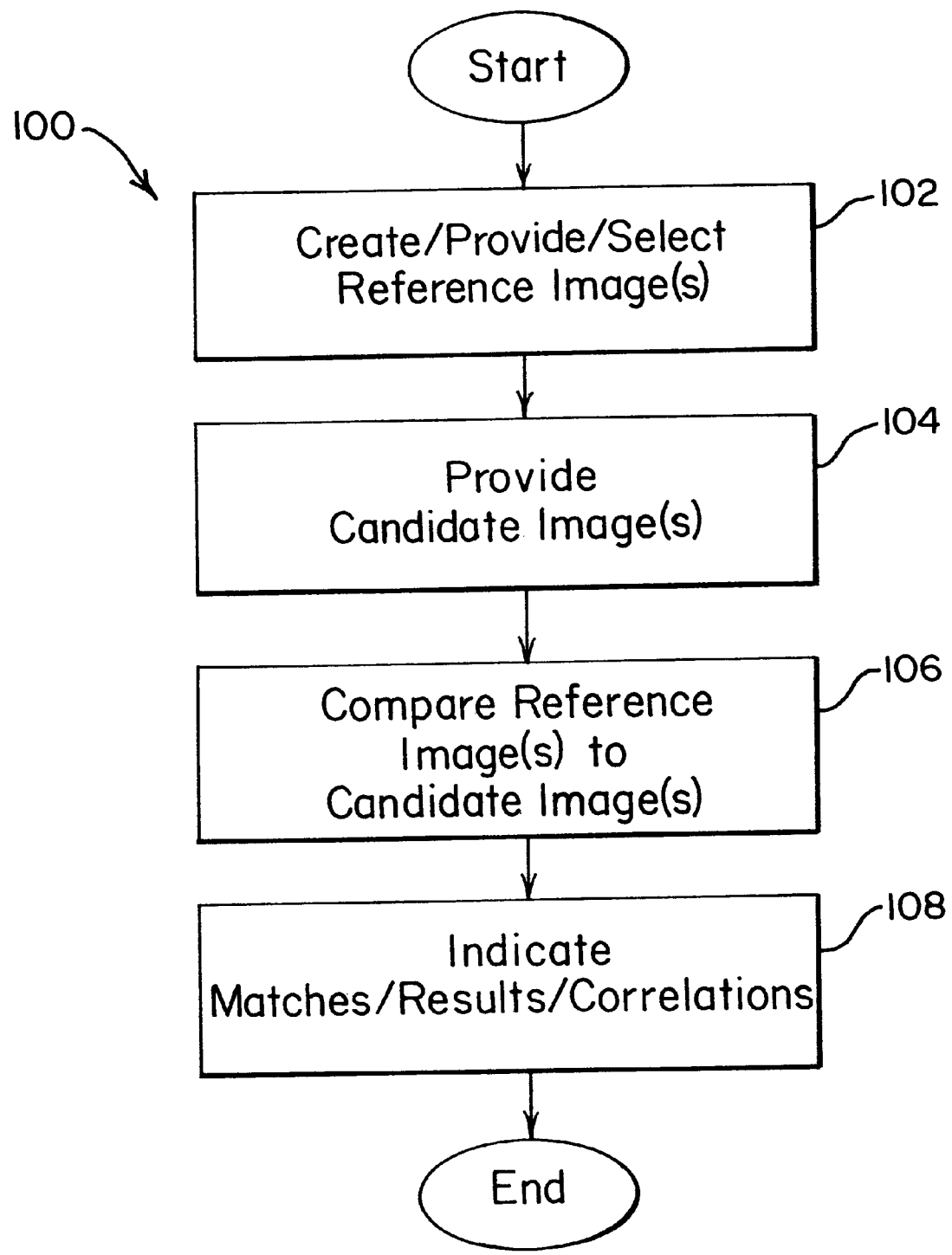
FIG. 1 is a general flowchart of a first embodiment of a method in accordance with the principles of the present invention.

A first embodiment 100 of a method in accordance with the present invention is illustrated in FIG. 1 and includes a step 102 wherein a user, computer, applicatory or other device creates, identifies, selects, provides or otherwise produces one or more reference, filter, or search images that the user, computer, or other device wants to search for, a step 104 wherein one or more candidate or target images are retrieved or otherwise provided or produced that are to be compared to the one or more of the reference images produced by the user, computer, application, or other device during the step 102, a step 106 of comparing one or more of the candidate images with one or more of the reference images, and a step 108 of indicating or providing to the user, computer, software application or other device the results of the comparisons between the reference images and the candidate images conducted during the step 108 and the degree of correlation or matching between one or more of the candidate images and one or more of the reference images compared during the step 106. The method 100 and each of the steps 102, 104, 106, 108 will be discussed in more detail below.

A significant advantage of the method 100 is that the method 100 allows efficient and relatively high speed comparisons of one or more reference images and one or more candidate images. In addition, the candidate images may be located on or in one or more centralized or distributed application servers, database servers, web site servers, or other devices. The comparisons of reference images and candidate images during the step 106 are preferably performed using optical processing techniques. More specifically in the method 100, the comparisons of one or more reference images with one or more candidate images is preferably done using optical correlation and spatial light modulators. As will be discussed in more detail below, a spatial light modulator can allow a series of images to be created in a very short period of time and spatial light modulators can be used to create reference images and candidate images in an optical correlation system. Optical correlation then allows the candidate images and reference images created with the spatial light modulators to be compared efficiently and often in real time, even if the candidate images and reference images are stored in different formats, i.e., GIF, JPEG, BMP, TIF, etc.

Another significant advantage of the method 100 is that the term "image" is construed very broadly and includes not only such content as graphics, pictures, and other typical pictorial files, but also content of software files, text files, music and sound files, etc. That is, since any digital file of information or data is content, in essence, a series of zeros and ones, the digital file of such content can be treated as an image for purposes of the method 100, regardless of whether the digital file represents a graphic image, a text file, a music or sound file, a software program, etc. Therefore, the method 100 provides, and specifically contemplates, searching for and comparing candidate images to reference images wherein the candidate images and reference images represent content of software files, text files, music and sound files, graphics, etc.

Figure 2:
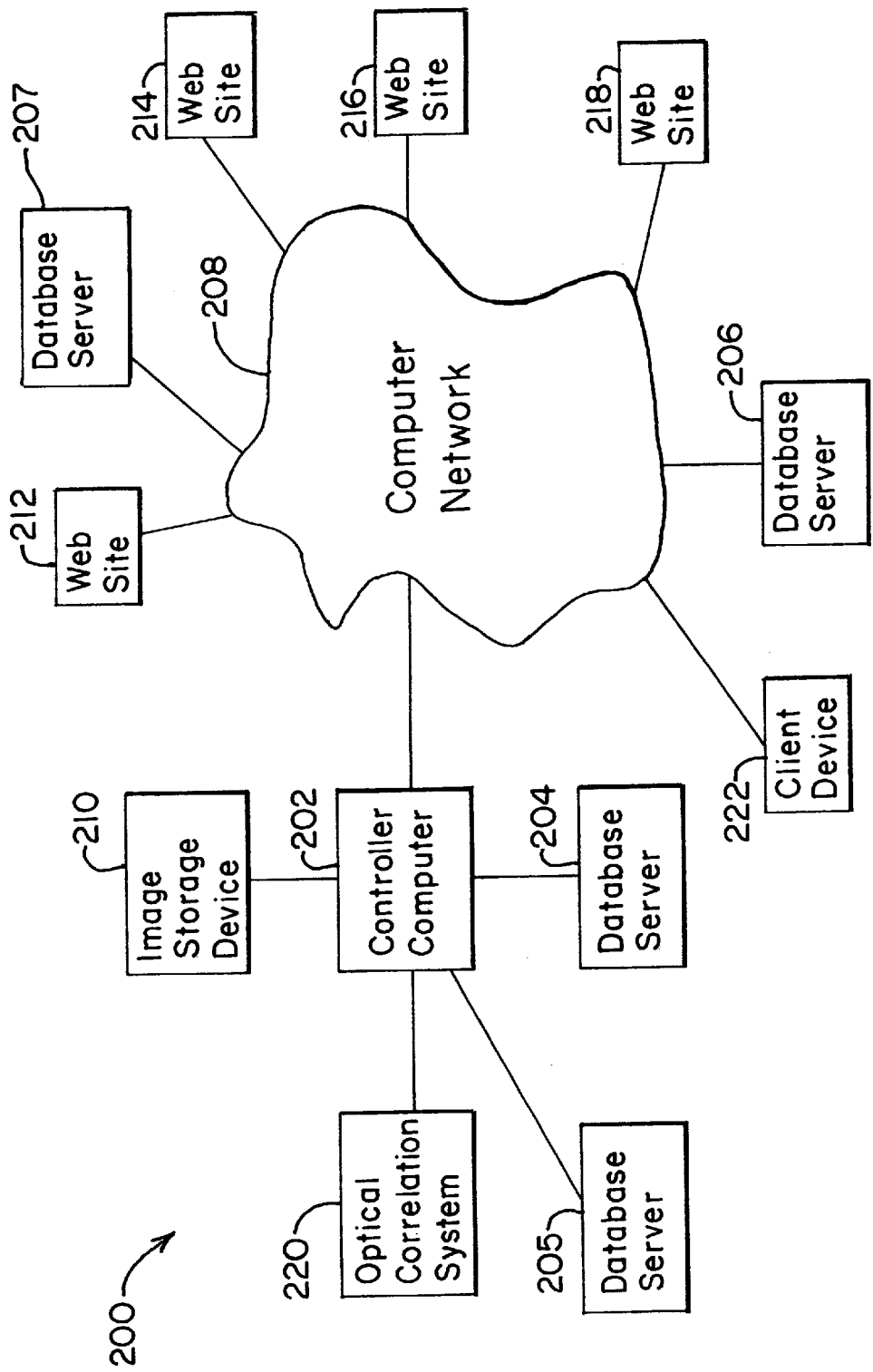
FIG. 2 is block diagram representation of a system with which the method of FIG. 1 might be used.

A typical computer or communications network or configuration 200 in or on which the method 100 might be used or implemented is illustrated in FIG. 2 and includes a central computer, controller, terminal, or other client device or computer system 202 that is locally connected to one or more database services, application servers, or storage devices 204, 205 on which one or more images or databases or repositories of images are stored. In addition, the client device 202 is also connected or connectable to other database servers, application servers, or image repositories 206, 207 via a computer network 208. The client device 202 may also be connected or connectable to other local devices, such as the image storage device 210, and/or to other remote servers or devices, such as the web sites 212, 214, 216, 218, on or in which one or more images can be stored or used. The client device is also connected to an optical correlation system 220 in or on which comparisons between reference images or candidate images can be made. For purposes of explanation, but not limitation, of the method 100, the client device 202 will be discussed as being separate and distinct from the database and/or application servers 204, 205, 207, 208, the image storage device 210, the web sites 212, 214, 216, 218, and the optical correlation system 220. However, the client device 202 can also be combined with one or more of the database and/or application servers 204, 205, the image storage device 210, or the optical correlation system 220 and the method 100 should not be construed as preventing such possibilities. In addition, the client device 202 may also function as a database server, web site, or other device that is accessible via the computer network 208 from web sites, servers, and client devices, such as a client device 222. Furthermore, the client device 202 may allow a remote user to access the client device 202 to allow some or all of the steps in the method 100 to be performed or coordinated on behalf of the user by the client device 202.

The local connections between the client device 202 and the database servers 204, 205, the image storage device 210, and the optical correlation system 220 can be done through direct connection, a dial-up connection, a local area network, a wireless or cellular network, etc. and the methods disclosed herein should not be limited in any way in how the client device 202 communicates with or is connected to the database servers 204, 205, 207, 208, the image storage device 210, the web sites 212, 214, 216, 218, the optical correlation system 220, or the client device 222.

Now referring back to FIG. 1, the method 100 will now be discussed in more detail in relation to the system configuration 200 illustrated in FIG. 2. As previously discussed, during the step 102, a user, computer, application or other device preferably produces one or more reference images by creating, providing, or selecting one or more images that the user, computer, or other device is interested in searching for. As contemplated by the present invention, a user will generally conduct such a step using either the client device 202 or the client device 222.

During the step 102 wherein a user, computer, application, or other device produces one or more reference or source images, the user, computer, or other device may provide specific images or pictures to the client device 202 or the client device 222 that the user, computer, application, or other device is interested in, the user may create images using drawing, graphic, illustration, scanning, or other software resident on the client device 202 or the client device 222, and/or the user, computer, application, or other device may select from images provided by the client device 202 or the client device 222. More than one reference image can be produced or provided during the step 102 and the reference images might vary by the colors, shapes, sizes, textures, etc. contained in them. Thus, for example, a user might create, provide, or select one or more reference images during the step 102 that include shapes that the user is looking for, one or more reference images that include colors that the user is looking for in conjunction with the shapes, and one or more reference images that include textures that the user is looking for in conjunction with the shapes and colors. As another example, a user might produce basic or general reference images of ducks, architectural plans, tanks, design schematics, cars, barns, jets, mug shots, etc. during the step 102 and the user might be interested in locating candidate images that are similar. As a third example, a user interested in finding images of Walt Disney characters might produce one or more different images of Mickey Mouse or Donald Duck during the step 102 for use as reference images.

To create reference images during the step 102, a user might combine drawing with conventional software tools that are well known in the art. For example, drawing a circle by first clicking on a drawing icon representing a circle and then "clicking and dragging" a computer mouse so as to change the size of the circle. A user might also create a reference image by starting with an image having content similar to that sought in a candidate image and cropping the image so that the superfluous content is omitted from the overall image. The user might logically combine multiple image elements; e.g., (duck) AND (pond) AND (cloudy sky), by selecting such elements of images and using logical or boolean functions or operators to combine the elements into a single image.

While the previous discussion has focused on a user producing one or more reference images, it should be noted that the reference images may be created, selected, provided, or otherwise produced by without user, i.e., human, intervention. That is, the method 100 does not require any specific way of creating, selecting, providing, or otherwise producing reference images and it is specifically contemplated that the method 100 will allow electronic, automated, assisted, or computerized production of reference images during the step 102 and candidate images during the step 104.

Once one or more reference images are created, provide, selected or otherwise produced during the step 102, one or more candidate images are provided or otherwise produced during the step 104 that will be compared during the step 106 to the reference images. The client device 202 or an application resident and operating on the client device 202 may retrieve or provide candidate images from one or more sources or databases of images. For example, the client device 202 may retrieve one or more candidate images from one or more of the database servers 204, 205, 206, 207 and/or the image storage device 210.

Alternatively, or in addition, to retrieving one or more candidate images from one or more of the database servers 204, 205, 206, 207 and/or the image storage device 210, the controller or client device 202 or another application or device may retrieve or download one or more candidate images from one or more of the web sites 212, 214, 216, 218 using browser or other software resident and operating on the client device 202. The user, application, or client device 202 may select specific web sites to look at or start with or the client device may begin random or systematic searching of some or all web sites.

In general, communication between a client device, such as the client device 202, and a web site server accessible from or with the client device via the World Wide Web, such as the web site 212, is possible as a result of the conventions and protocols established to enable such communication. More specifically, the Transmission Control Protocol/Internet Protocol (TCP/IP), the File Transfer Protocol (FTP), the Hypertext Transfer Protocol (HTTP), and the Hypertext Mark-up Language (HTML) allow communication between client devices and web sites that support or follow such protocols or conventions. During such communication, HTML compliant documents, images, digital files, etc. can be retrieved or downloaded from the web sites by browser or other specialized software, resident and operating on the client device working in conjunction with software on the web site servers. Therefore, one or more candidate images can be retrieved or downloaded from one or more web sites during the step 104 for comparison to the reference images created, provided, or selected during the step 102. For example, software might download or retrieve an HTML file from a web site, search through its text for all references to graphic files (JPEGs, GIFs, etc.) or other images contained in the HTML file, then download or retrieve only the graphic files for further processing and comparison. In general, at no time would the web page need to be displayed on a screen or to a user.

One alternative to the retrieving potential candidate images from web sites as described immediately above is to create and use one or more software programs to specifically roam and search the World Wide Web looking for and retrieving candidate images. Such kinds of software programs are often referred to as "robots" or "spiders" or "wanderers" and they may be used to roam the World Wide Web and visit web sites in a random, controlled, or autonomous manner searching for images or other information in or on web sites. The software programs can send the images to the client device 202 or some other designated location, device, or electronic address, or otherwise cause the images to be sent to the client device 202 or some other designated location, server or other device, or electronic address. For example, the software programs can transmit or send the potential candidate images discovered by the software programs to the database server 204 and/or the database server 205 for short term or long term storage. The software programs may also send other information to the database server 204 and/or the database server 205, such as information relating to the content of the web sites from which the images were retrieved, the Uniform Resource Locators (URLs) of the web sites from which the images were retrieved, etc. The client device 202, when looking or searching for candidate images, can conduct an image search in the database servers 204, 205 and/or retrieve image from the database servers 204, 205, without accessing the computer network 208. After retrieval of candidate images from the database servers 204, 205 is complete, the images stored in the database servers 204, 205 can be deleted or stored for use during another search for candidate images. In this example, the robots, spiders, and wanderers moving through and searching the World Wide Web essentially create a centralized database or repository of images out of a distributed database or repository of images. The robots, spiders, and wanderers can begin operation only after the step 102 or they can be continuous operation such that a centralized database of potential candidate images is being continuously built up for use or access by the client device 202 during multiple or repeated implementations of the step 104 or the entire method 100.

After one or more candidate images are found, retrieved, downloaded, etc. during the step 104, each of the candidate images is preferably compared to, or correlated against, each of the reference images produced during the step 102 and the amount of correlation or match between the two images is determined during the step 106. Comparisons between reference images and candidate images during the step 106 may begin prior to the completion of the step 104. That is, the steps 104 and 106 overlap such that comparisons between candidate images and reference images during the step 106 may begin as soon as a candidate image is provided during the step 104. Moreover, a queue of series of candidate images may be created during the step 104 so that the optical correlation system 220 always has at least one candidate image ready for comparison with one or more reference images during the step 106. Of course, the optical correlation system 220 may be designed such that more than one comparison between a reference image and a candidate image is occurring simultaneously and it is specifically contemplated that the method 100 can be implemented in a scalable computer environment such that many comparisons between reference images and candidate images may be occurring or in process simultaneously.

As previously discussed above, optical correlation is a useful tool for recognizing and detecting visual patterns in real time and has great potential for use in high speed pattern recognition or comparison. As a result, optical correlation is preferably used during the step 106 to allow relatively fast and efficient comparisons of reference images and candidate images.

A key component of many optical correlation systems is the apparatus and method for creating images that are to be compared. As previously discussed above, the development of spatial light modulators (SLMs) has provided an ability to create images in real time or near real time that can be compared using optical correlation techniques. A spatial light modulator can be used to directly create or display an image or a Fourier transform of an image. A Fourier transform of an image is a transformation that allows many characteristics of the image to be more easily and quickly ascertained and compared.

In general, an electrically or electronically addressed spatial light modulator (ESLM) or an optically addressed spatial light modulator (OASLM) is a two-dimensional grid of electrically addressable or optically controlled pixels that can function as a reusable and programmable transparency, mask, or piece of film to create images in real time. Thus, the ESLM converts electrical signals into pixels that form images and that spatially modulate light passing through the ESLM. In an OASLM, light passing through the OASLM causes pixels to operate in either a transparent or opaque state until the OASLM is reset, thereby allowing the OASLM to form an image that spatially modulates light passing through the OASLM until the OASLM is reset.

Each of the pixels in a spatial light modulator is individually controllable such that the grid of pixels can be used to create a close approximation of any desired image. In a typical spatial light modulator, each pixel may have a dimension of ten by ten microns and the spatial light modulator may have a resolution of eight hundred pixels by six hundred pixels. The spatial light modulator can switch between or change images at extremely high speeds and a typical spatial light modulator may be able to create between sixty and two hundred fifty-five distinct images per second.

Optical correlation can be effected using many different types of correlator architecture. The most common is the 4-f correlator in which a reference image is digitally Fourier transformed and the digital Fourier transform is displayed on the filter spatial light modulator. Multiple candidate images are displayed on an input spatial light modulator and the light that is thereby modulated is optically Fourier transformed by a lens. This Fourier transform of the input light is multiplied by a second filter spatial light modulator and the resulting light product is then Fourier transformed by a lens. This second Fourier transform is detected by a sensor such as a CCD detector array or a smart-pixel device. The resulting signal indicates the similarity of the candidate to the reference and its location in the input image.

A preferred optical correlator architecture for the present invention is a joint transform correlator. In general, in a joint transform correlator, a coherent light source is modulated by an image created by an optically addressed spatial light modulator (OASLM) and Fourier transformed by a lens. The joint transform; i.e., the optical interference of the Fourier transforms of the candidate and reference images, is incident on the detector side of an optically addressed spatial light modulator. This results in a modulating pattern on the liquid crystal side on the transform plane of the optically addressed spatial light modulator. Coherent light is modulated by the transform plane of the optically addressed spatial light modulator and Fourier transformed by a lens. This second Fourier transform is incident on detecting means such as CCD camera or centroiding detector array pairs described elsewhere. More specifically, in a joint transform correlator, reference and candidate images are input or created by two microdisplays, such as the Colorado Microdisplay CMD8X6P microdisplay. The images from these displayed are imaged onto one or two optically addressed spatial light modulators, such as a Hamamatsu PAL-SLM685 spatial light modulator, using either coherent laser light or non-coherent light from, say, a light emitting diode (LED). The two images are then Fourier transformed by a lens and projected onto a third spatial light modulator in the correlation plane using coherent laser light. A final lens focuses the resulting inverse Fourier transformed result onto one or more detectors, again using coherent laser light. Architecting the input to the optical correlator in this way has four advantages over common joint transform correlators and the 4-f correlator: first, by imaging the reference and candidate images from the microdisplays onto optically addressed spatial light modulators using non-coherent light, the need for high optical quality in the microdisplays is obviated, thereby allowing the use of off-the-shelf microdisplays; second, due to the characteristics of non-coherent light illumination, the input microdisplays need not be well aligned to each other; third, there is no need to precalculate a Fourier transformed reference image as would be necessary if using a 4-f correlator as this transform is accomplished optically; fourth, since each stage of the correlator uses an optically addressed spatial light modulator to transfer the image and no light is directly coupled from stage to stage, each stage can be independently aligned and calibrated.

Figure 3:
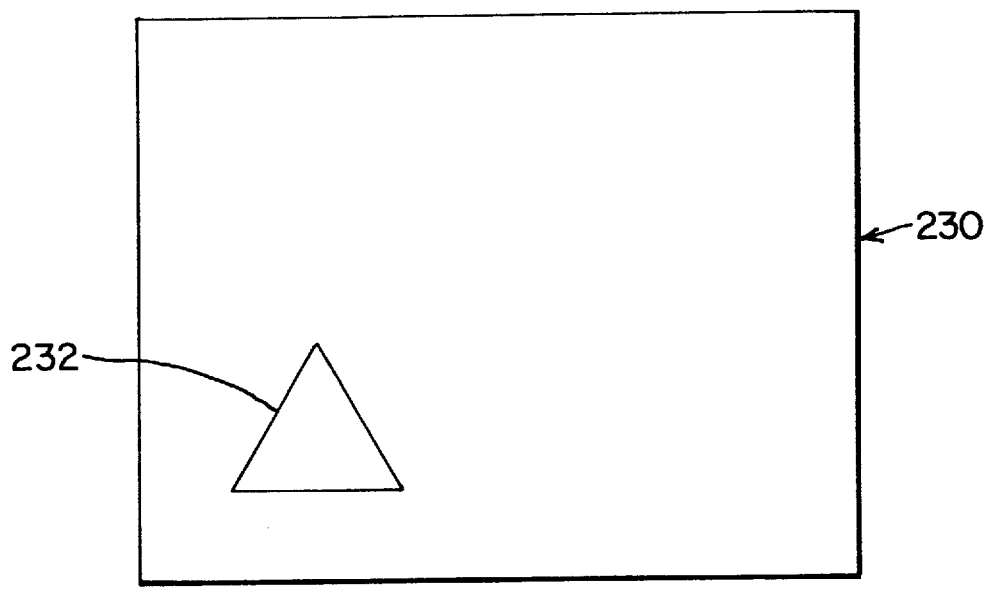
FIG. 3 is a representative reference image that can be used with the method of FIG. 1.
Figure 4:
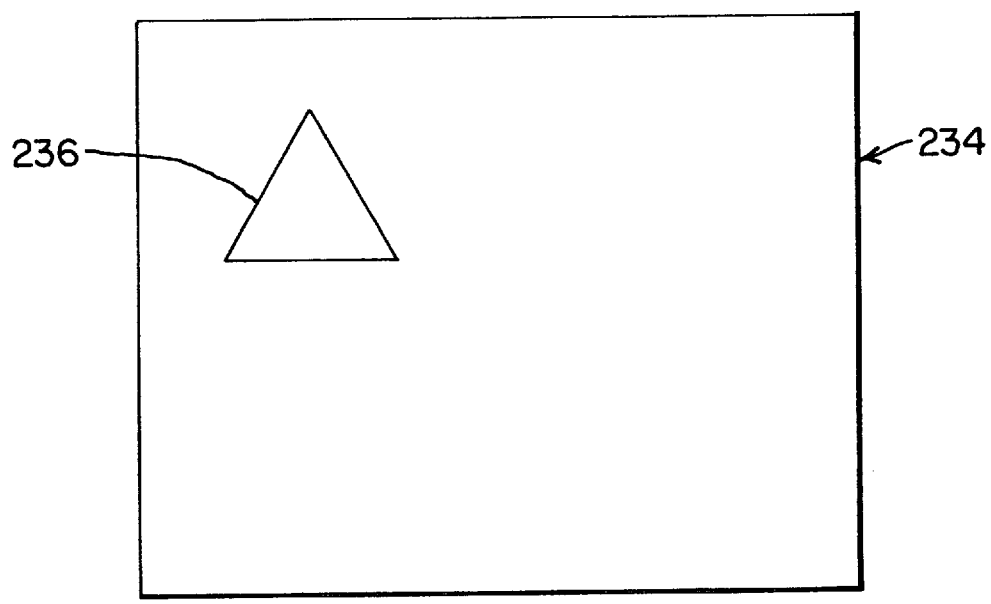
FIG. 4 is a representative candidate image that can be compared against the reference image of FIG. 3.

Another advantage provided by optical correlation for image matching is the fact that correlations or matches between the reference images and candidate images or portions of the reference images and the candidate images, can be found even if the reference images and candidate images are similar rather than identical. For example, assume that a user desires to search for a reference image 230 that includes a triangularly shaped component 232, as illustrated in FIG. 3. Comparing the reference image 230 to a candidate image 234 that also includes a triangularly shaped component 236, as illustrated in FIG. 4, using optical correlation will result in a high degree of matching or correlation between the reference image 230 and the candidate image 234, even though the triangularly shaped component 236 in the candidate image 234 is positioned in a different location than the triangularly shaped component 232 in the reference image 230.

Figure 5:
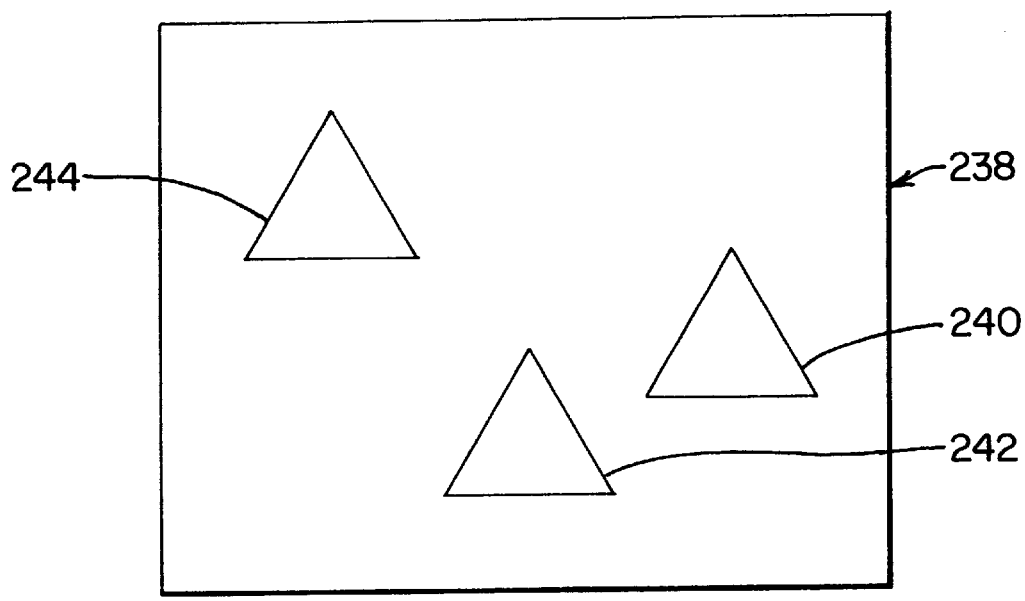
FIG. 5 is another representative candidate image that can be compared against the reference image of FIG. 4.

If a candidate image, such as the candidate image 238 illustrated in FIG. 5, is compared to the reference image 230 using optical correlation, a high degree of matching or correlation will be found between the candidate image 238 and the reference image 230, such comparison indicating that the candidate image 238 includes three triangularly shaped components 240, 242, 246, all of which are similar to the triangularly shaped component 232 in the reference image 230, but positioned in different locations in the candidate image 238 than is the triangularly shaped component 232 in the reference image 230.

Figure 6:
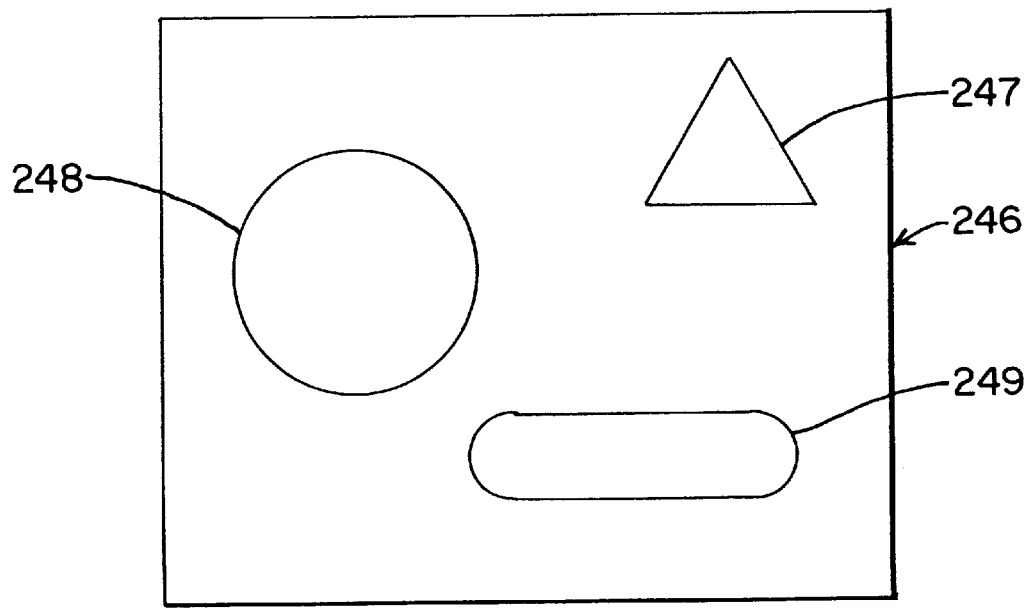
FIG. 6 is another representative candidate image that can be compared against the reference image of FIG. 4.

A high degree of correlation will also be found between shapes or components in a reference image, such as the reference image 230, and candidate images that include other shapes, such as the candidate image 246 illustrated in FIG. 6. The candidate image 246 includes a triangularly shaped component 247 as well as a circular shaped component 248 and an oval shaped component 249. Comparing the reference image 230 and the candidate image 246 using optical correlation will indicate a match between the triangularly shaped component 232 in the reference image 230 and the triangularly shaped component 247 in the candidate image 246, despite the fact that the triangularly shaped components 232, 246 are located in different locations in their respective images and despite the fact that the candidate image 246 includes additional components not found in the reference image 230.

The operation and use of optical correlation and spatial light modulators is within the range of capabilities of a person of ordinary skill in the art and no further discussion or explanation of the principles of optical correlation and spatial light modulators is needed for purposes of elaboration or explanation of the method 100 of the present invention. Additional and more detailed information regarding the operation, structure, and use of optical correlation, optical correlators and optical correlation systems, and spatial light modulators can be found in U.S. Pat. Nos. 5,173,954, 5,220,622, 5,257,322, 5,323,472, 5,418,380, 5,841,907, all of which are incorporated herein by reference.

Figure 7:
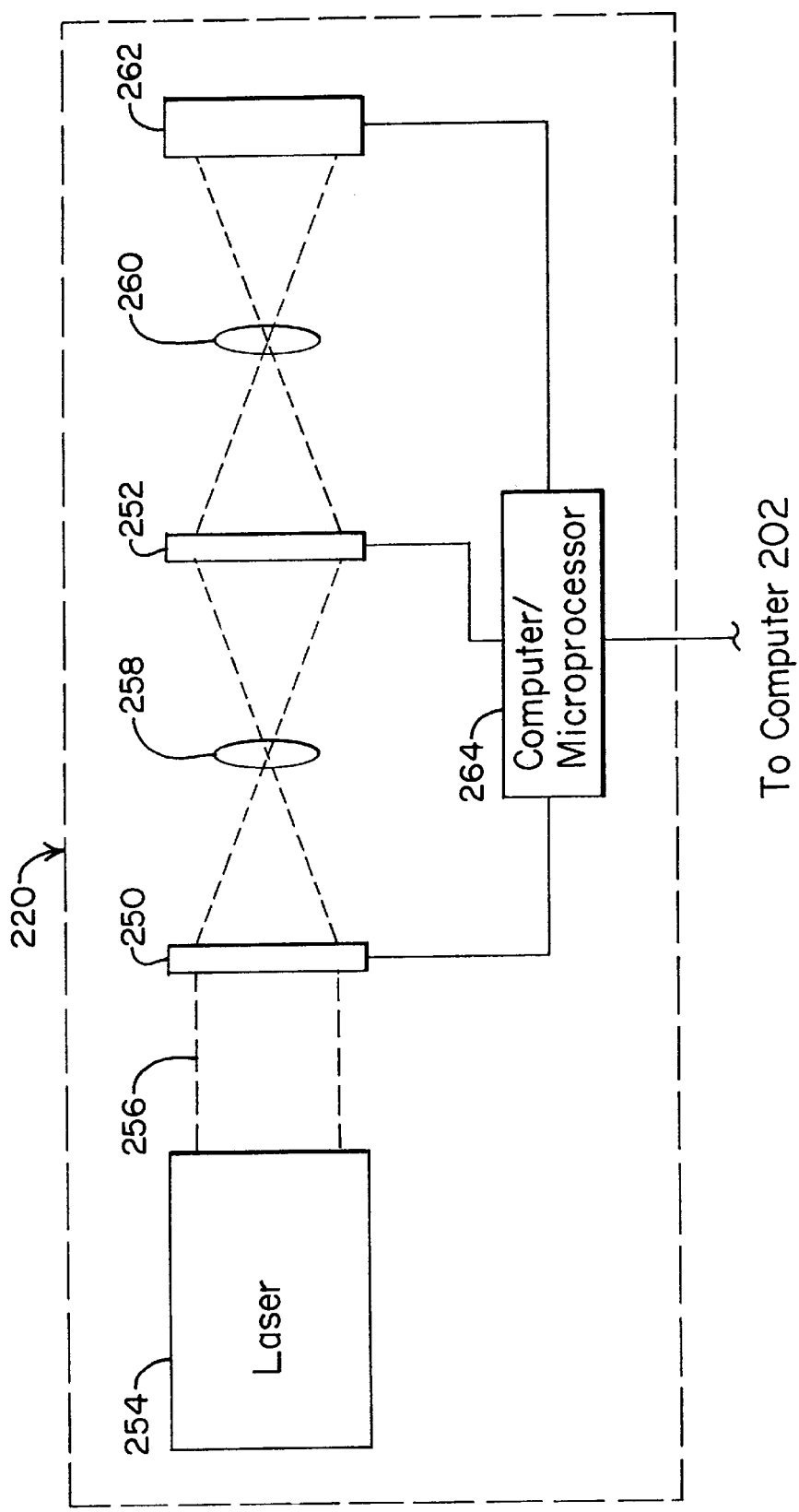
FIG. 7 is a block diagram of a representative optical correlation system using spatial light modulators that can be used with the method of FIG. 1.

While optical correlation using spatial light modulators is known in the prior art and no specific implementation of an optical correlation system is required for the method 100, a general optical correlation system suitable for use with the method 100 as the optical correlation system 220 is illustrated in FIG. 7 and will be discussed in more detail below. The optical correlation system 220 includes two spatial light modulators (SLMs) 250, 252. The spatial light modulator 250 preferably is used to create or reproduce candidate images image(s) while the spatial light modulator 252 is used to create or reproduce reference image(s) or Fourier transforms of reference image(s).

The optical correlation system 220 can compare two images stored in different formats. For example, an image stored in JPEG format can be used to create a reference image or a Fourier transform of a reference image on the spatial light modulator 252 while an image stored in a GIF or BMP format can be used to create a candidate image on the spatial light modulator 250 which can be compared using the optical correlation system 220 since creating the images on the spatial light modulators 250, 252, acts as or creates a common, native-made format for comparison purposes.

The optical correlation system 220 also includes a laser or other light source 254 which preferably provides a coherent laser or light beam 256. The light beam 256 shines on and passes through the spatial light modulator 250. After passing through or reflecting off of the spatial light modulator 250, the light or laser beam passes through a Fourier transform lens 255 before reaching the spatial light modulator 252. A second Fourier transform lens 260 is positioned between the spatial light modulator 252 and a CCD or photodiode camera, detector, array, or other device 262 on which correlations/comparisons between the reference image or Fourier transform of a reference image created by the spatial light modulator 252 and the candidate image created by the spatial light modulator 250 are recorded, captured, or otherwise detected.

A computer or microprocessor 264 controls the operation of the spatial light modulators 250, 252 in the sense that the computer or microprocessor 264 controls the reference images or Fourier transforms of reference images created, displayed, or portrayed by the spatial light modulator 252 and the candidate images created, displayed, or portrayed by the spatial light modulator 250. Therefore, the computer 264 preferably can display images on the spatial light modulators 250, 252 regardless of what format(s) the images are created or stored in. During use of the optical correlation system 220, the computer 264 preferably creates or pre-calculates a Fourier transform of a reference image and causes the spatial light modulator 252 to display the Fourier transform of the reference image. The computer 264 can then generate a series of candidate images on the spatial light modulator 250 which are Fourier transformed by the lens 258 for comparison to the Fourier transform of the reference image created by the spatial light modulator 252. In this configuration, the Fourier transform of the reference image is being calculated or determined by the computer 264 while the Fourier transform of the candidate image(s) is being created by light passing through the spatial light modulator 250 and the Fourier transform lens 258. The computer or microprocessor 264 also receives information or data from the CCD or photodiode camera, array, or other device 262 regarding the image comparison and may control the operation of the CCD or photodiode camera, array, or other device 262.

The computer or microprocessor 264 preferably is connected to or otherwise communicates with the controller or client device 202 so that reference images and candidate images can be sent from the controller 202 to the computer or microprocessor 264 and so that the computer or microprocessor 264 can send information or data regarding the correlation or comparison of reference images to candidate images. The computer or microprocessor 264 and the controller or client device 202 may be one and the same computer, computer system, microprocessor, server, client device, controller, etc. or they may be separate and distinct and permanently, temporarily, or periodically connected directly or via a computer or other communications network.

While the general design for optical correlation system 220 described above allows for comparison of reference images and candidate images, preferably the optical correlation system will be capable of finding components from reference images in candidate images, even if the components have different sizes in the reference and candidate images and different rotational and/or translational positions in the reference and candidate images.

Figure 8:
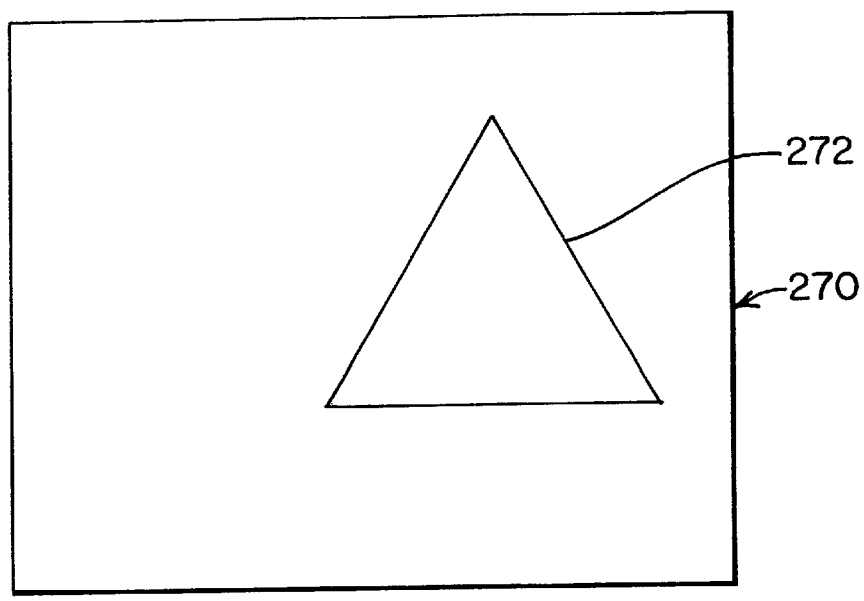
FIG. 8 is a further representative candidate image that can be compared against the reference image of FIG. 4.
Figure 9:
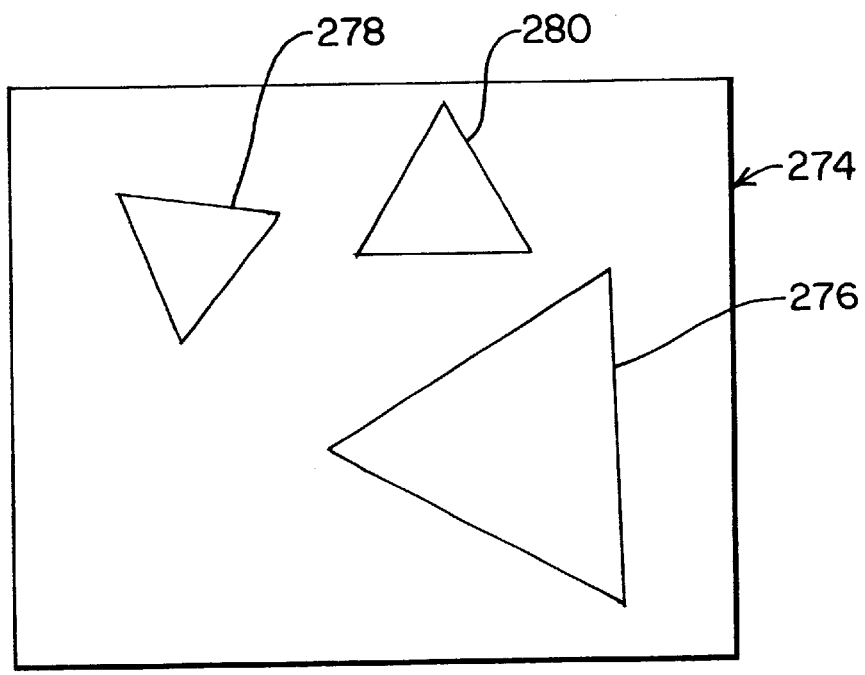
FIG. 9 is another representative candidate image that can be compared against the reference image of FIG. 4.

A comparison of a reference image and candidate image using optical correlation allows for shapes and other components of the reference image to be located in the candidate image, even if the position of such shapes and other components in the candidate image is different from the location of the shapes and other components in the reference image, i.e., even if the shapes and other components in the candidate image are translated into a different position from their position in the reference image as previously described above in relation to FIGS. 4–6. Preferably, the optical correlation system 220 will also indicate such shapes and other components in the candidate image even if the shapes and other components have a different size than their counterparts in the reference image and/or even if they are rotated relative to their counterparts in the reference image. For example, if the reference image is the reference image 230 illustrated in FIG. 3 and previously described above, the optical correlation system 220 will preferably find matches or correlations between the reference image 230 and a candidate image 270 illustrated in FIG. 8, particularly between the triangularly shaped component 232 in the reference image 230 and a triangularly shaped component 272 in the candidate image 270, even the through the two triangularly shaped components 232, 272 have different sizes and different locations in their respective images 230, 270. Similarly, the optical correlation system 220 will also preferably find matches or correlations between the reference image 230 and a candidate image 274 illustrated in FIG. 9, particularly between the triangularly shaped component 232 in the reference image 230 and the three triangularly shaped components 276, 278, 280 in the candidate image 274, even though the triangularly shaped components 274, 278, 280 are translationally and/or rotationally positioned differently in the candidate image 274 than in the reference image 230 and even though the triangularly shaped component 276 in the candidate image 274 is larger than the triangularly shaped component 232 in the reference image 230.

One way to allow for the optical correlation system 220 to find components in candidate images that are rotated or scaled versions of components in a reference image is to take each reference image produced during the step 102 and create additional versions of the reference image that are larger and/or smaller than the originally produced reference image. The additional and differently scaled or sized versions of the originally produced reference image can be created electronically by the client devices 202, 206 during the step 102 or electronically, mechanically, or optically by the optical correlation system 220 before or during the step 106. The method 100 may optionally allow the user to select or determine how many differently scaled or sized versions of the originally produced reference image will be created or used. The originally produced reference image plus the additional versions can all then be treated as reference images during the step 106.

In addition to, or as an alternative to, providing different scaled versions of reference images, the method 100 may include taking a reference image produced by the user during the step 102 and created different versions of the reference image, each version being a rotated version of the originally produced reference image. The additional and differently rotated versions of the originally produced reference image can be created electronically by the client devices 202, 206 during the step 102 or electronically, mechanically, or optically by the optical correlation system 220 before or during the step 106. The method 100 may optionally allow the user to select or determine how many differently rotated versions of the originally produced reference image will be created or used. The originally produced reference image plus the additional versions can all then be treated as reference images during the step 106.

As a result of creating versions of originally produced reference images that are either rotated versions of the originally produced reference images or rescaled or resized versions of the originally produced reference images, or both, the method 100 allows comparisons between reference images and candidate images that rotationally and/or size or scale invariant. In addition, while the previous discussion has focused primarily on rotating or rescaling reference images, additional versions of candidate images having different rotations and/or sizes can also be created and used with the method 100.

After comparisons are made between one or more reference images and one or more candidate images during the step 106, the results of the comparisons can be reported or indicated during the step 108. For example, client device 202 might indicate or show to a user the closest match or matches of one or more candidate images for each reference image and the degree of correlation between the closest candidate images and reference image match or matches. The results might also be transmitted to a remote user, such as a user located at or using the client device 222 or to a locally or remotely operating software application or device.

As previously discussed above, a significant aspect of the present invention is that image comparisons can be made between content of software files, text files, music and sound files, which have been converted into a format usable with the optical correlation system 220. More specifically, most, if not all, digital or electronic files, regardless of whether the files represent content such as pictures, text, software code or instructions, music or sound, etc., are encoded using a series of zeros and ones. As a result, digital files content, i.e., a series of zeros and ones, can be converted into reference images and candidate images without regard to what the digital files represent or the digital encoding process or format used to create the digital file or image. That is, all digital files content can be converted into images usable with the method 100. For example, if content of one software file is converted into a reference image and content of another software file is converted into a candidate image in the same or similar way, the content of the two files can be compared during the step 106 as previously described above. So long as the content of two digital files can be converted into reference and/or candidate images in the same or similar way, similarities between the content of the two files can be found or determined using optical correlation.

One way to convert a digital file representing a software file, a sound or music file, a text file, etc. into a candidate or reference image suitable for use with the method 100 is to treat its content data bytes as pixels. A fixed resolution could be used, mapping each data byte to a fixed location on an optical correlator input device or spatial light modulator, such as the spatial light and modulation 250. Files which are larger than the displayable resolution of the spatial light modulator 250 can be represented as a second image. For example, content of a sound file from the movie 2001, A Space Odyssey, where the HAL9000 computer says, "I'm sorry Dave, I can't do that" will have a very different look when compared to content of a sound file wherein the muppet Kermit says, "Hi-Ho, Kermit the Frog here" [A] Content of a typical software file, "control.exe" from Windows 98, is shown, for example, in FIG. 10 as an image 300. Again, the image's 300 appearance is unique and characteristic of the software file from which it was produced, and, as such, the image 300 can be compared to other images representing software, content that was converted to such images in the same way.

Figure 10:
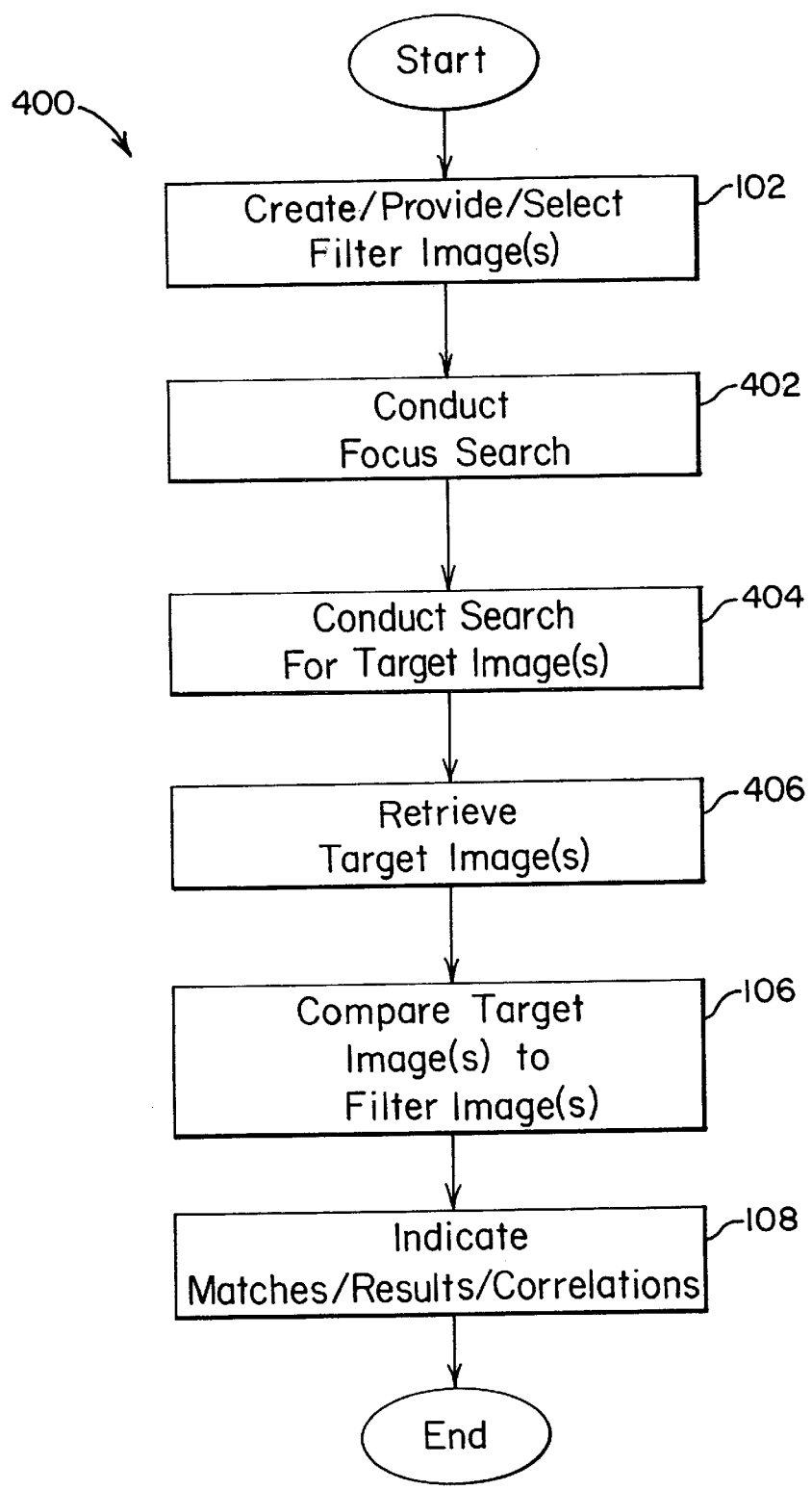
FIG. 10 is an alternative implementation of the method of FIG. 1.
Figure 11:
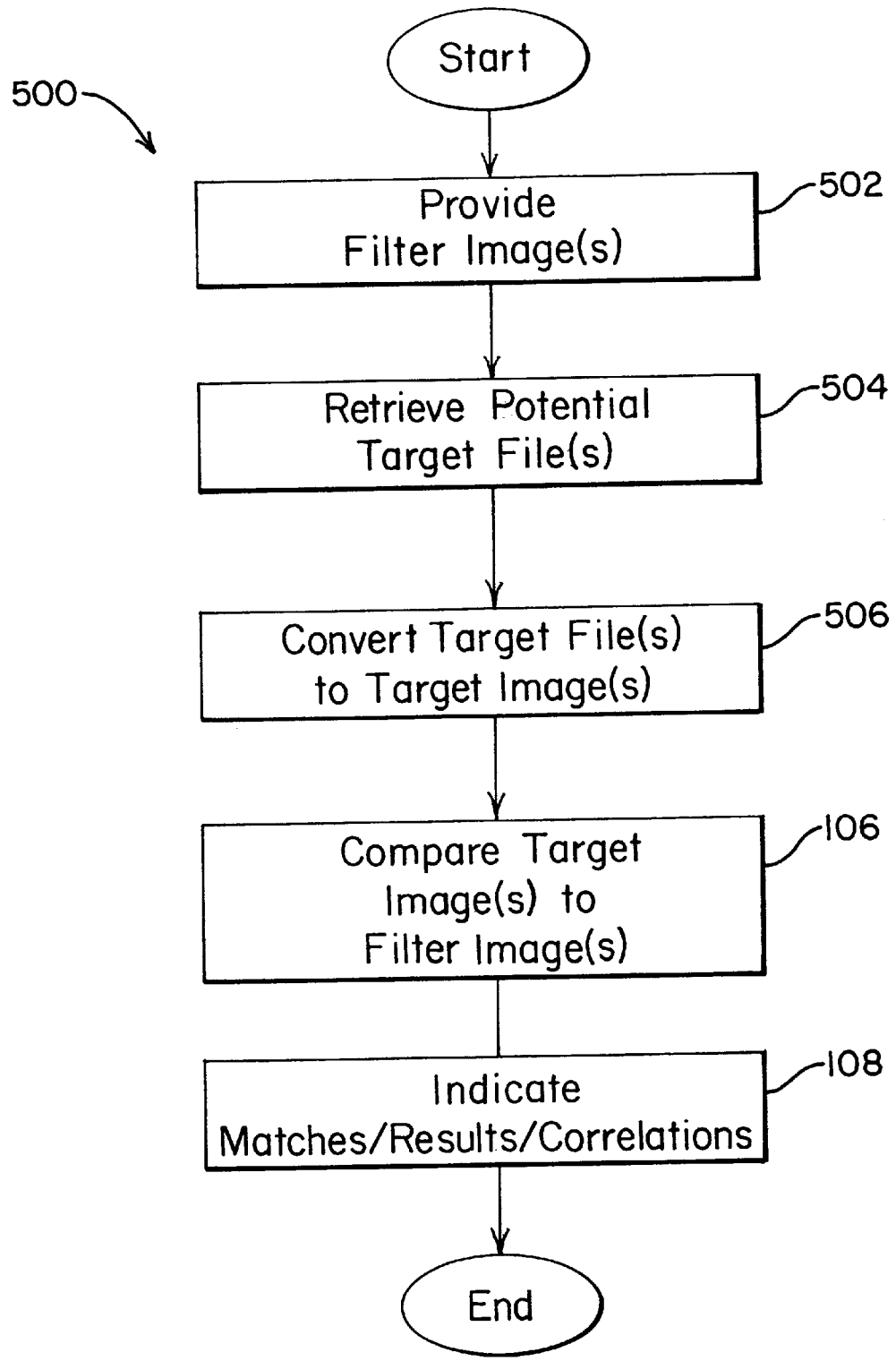
FIG. 11 is another alternative implementation of the method of FIG. 1.

An alternative embodiment 400 to the method 100 is illustrated in FIG. 10 and includes the steps 102, 106, 108 as previously described above. In addition, the method 400 includes a step 402 wherein in a focus search is done to find one or more databases, web sites, servers, etc. containing one or more potential candidate images, a step 404 wherein a search is performed for potential candidate images based on the results of the focus searching during the step 402, and a step 406 wherein one or more candidate images are retrieved or downloaded as a result of the searches conducted during the steps 402, 404. The method 400 is particularly useful when potential candidate images are stored in a decentralized manner, such as on web sites connected to the computer network 208. Each of the steps 402, 404, 406 will now be discussed in more detail.

During the step 402, a focus search is preferably conducted to locate web sites, database servers, etc. that may contain candidate images of interest. In general, candidate images will not be retrieved or downloaded during the step 402. Rather, the focus search is primarily directed to locating servers, web sites, or other devices in or which candidate images might be stored. For example, suppose a user is interested in locating images of ducks and provides reference images during the step 102 relating to ducks. During the step 402, a focus search may be conducted to find web sites, database servers, usenet servers, etc. that do or might contain images of ducks. Such a focus search may be conducted by doing a keyword or phrase search at well-known search engines, such as Alta Vista (http://www.altavista.com), Infoseek (http://infoseek.go.com), Lycos (http://www.lycos.com), Hotbot (http://www.hotbot.com), Webcrawler (http://www.webcrawler.com), etc., or subject matter directories, such as Yahoo (http://www.yahoo.com). A concept search at search engines such as Excite (http://www.excite.com) may also be conducted during the step 402. The image may be in many different formats, such as JPEG, BMP, or GIF formats, all of which can be used to create candidate images for comparison to one or more reference images, which themselves might have been created or stored in different formats.

Most search engines use spiders, robots, or wanderers that roam the World Wide Web to collect information about and URLs relating to web sites, usenet servers or listings, etc. which are then stored in a database or directory. A search conducted at one of the previously listed search engines or subject matter directories typically returns a list of web sites, usenet servers, classified advertisements, etc., and their associated URLs, likely to be relevant to the entered keyword, phrase, concept, or search term. Therefore, such web sites, usenet servers, news servers, etc. may be among the most likely places to look for relevant candidate images during the step 404.

After the focus search conducted during the step 402 is completed, the results of the focus search are used to direct and prioritize, but not necessarily limit, searching for candidate images during the step 404. For example, for the user searching for images of ducks, the focus search may result in a list of twenty web sites that are related to ducks. During the step 404, some or all of those twenty web sites may be searched for candidate images which are then downloaded or retrieved during the step 406. The search for candidate images during the step 404 may be limited to the twenty web sites found during the step 402 or may extended to other web sites, database servers, usenet listings, etc. In addition, the user may specify URL's, Internet Protocol (IP) addresses, gopher or File Transfer Protocol (FTP) addresses, or other electronic addresses for other devices or servers that can be searched for potential candidate images.

During the step 406, candidate images located during the step 404 are downloaded or otherwise retrieved for comparison to reference images 106 as previously described above.

Figure 12:
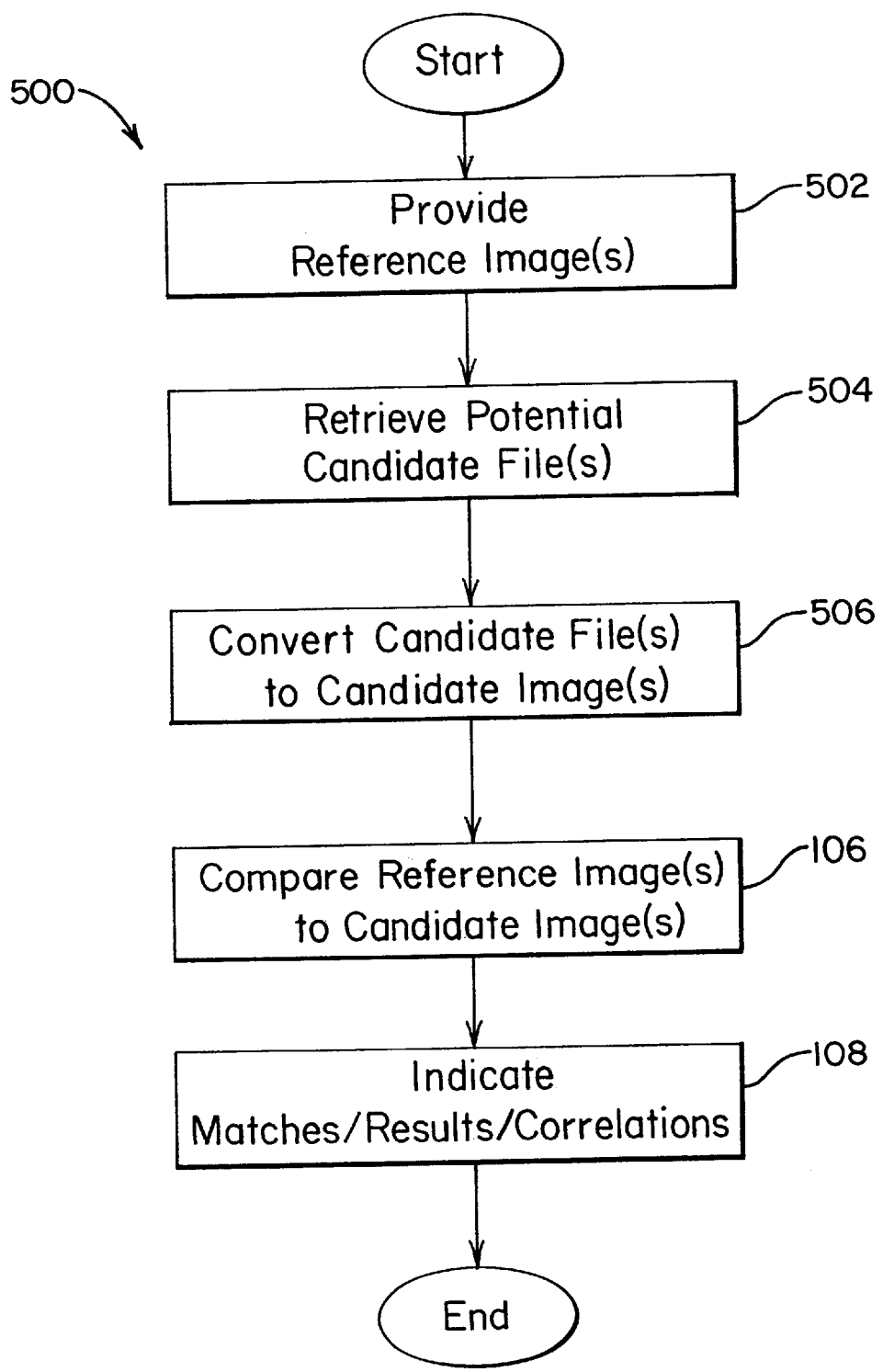
FIG. 12 is another alternative implementation of the method of FIG. 1.

Another alternative embodiment 500 to the method 100 is illustrated in FIG. 12 and includes the steps 106, 108 as previously described above. In addition, the method 500 includes a step 502 wherein reference images are provided or produced that represent sound or music files, software files, text files, etc., a step 504 wherein potential candidate files are located or otherwise provided or produced that may represent sound or music files, software files, text files, etc., and a step 506 wherein one or more candidate files are converted into candidate images prior to comparison to one or more reference images so that the candidate images are in a format more suitable for comparison during the step 106. Each of the steps 502, 504, 506 will now be discussed in more detail.

The method 500 is particularly well-suited for comparing digital files that do not represent visual images or which are stored or encoded in ways or formats not typically used with visual images. Therefore, in contrast to GIF, TIF, or JPEG formats, no identified or pre-set method or process exists to convert such digital files into visual images or Fourier transforms of visual images that can be created on the spatial light modulators 250, 252 or otherwise compared via an optical correlation system.

During the step 502, one or more reference files are provided in a manner generally similar to the step 102 previously described above. However, since the reference images may represent content of sound or music files, software files, text files, etc., such digital reference files content will need to be converted into reference images as part of the step 502. Such conversion of content from digital files into reference images can be performed during the step 502 as previously described above.

During the step 504, one or more candidate files are located, retrieved, downloaded, or otherwise produced that may represent sound or music files, software files, text files, etc., of interest. However, such sound or music files, software files, text files, etc., may be in digital formats that are very different from the formats of the digital files used to create or store the reference images. For example, a sound file might be resampled or might have been converted from MP3 to WAV formats.

As a result of the different digital file formats, the candidate files retrieved during the step 504 are preferably converted during the step 506 into new digital candidate files having the same or similar formats as the digital reference files previously converted into reference images during the step 502. For example, if a reference file is stored in MPS format, a candidate file in WAV format is preferably converted to MPS format before being used to create a candidate image. As another example, a text file in Microsoft Word format may need to be converted to ASCII format prior to being used to create a candidate image for comparison to a reference image created from a text file that was in ASCII format. After the candidate files are converted into the proper digital formats, the content of the new digital candidate files can be converted into candidate images during the step 506 that are usable during the step 106 for comparing the candidate images to reference images. The candidate images can then be compared to the reference images during the step 106 as previously described above. Preferably, the candidate files are converted into candidate images in the same or similar manner as the reference files are converted into reference images.

Figure 13:
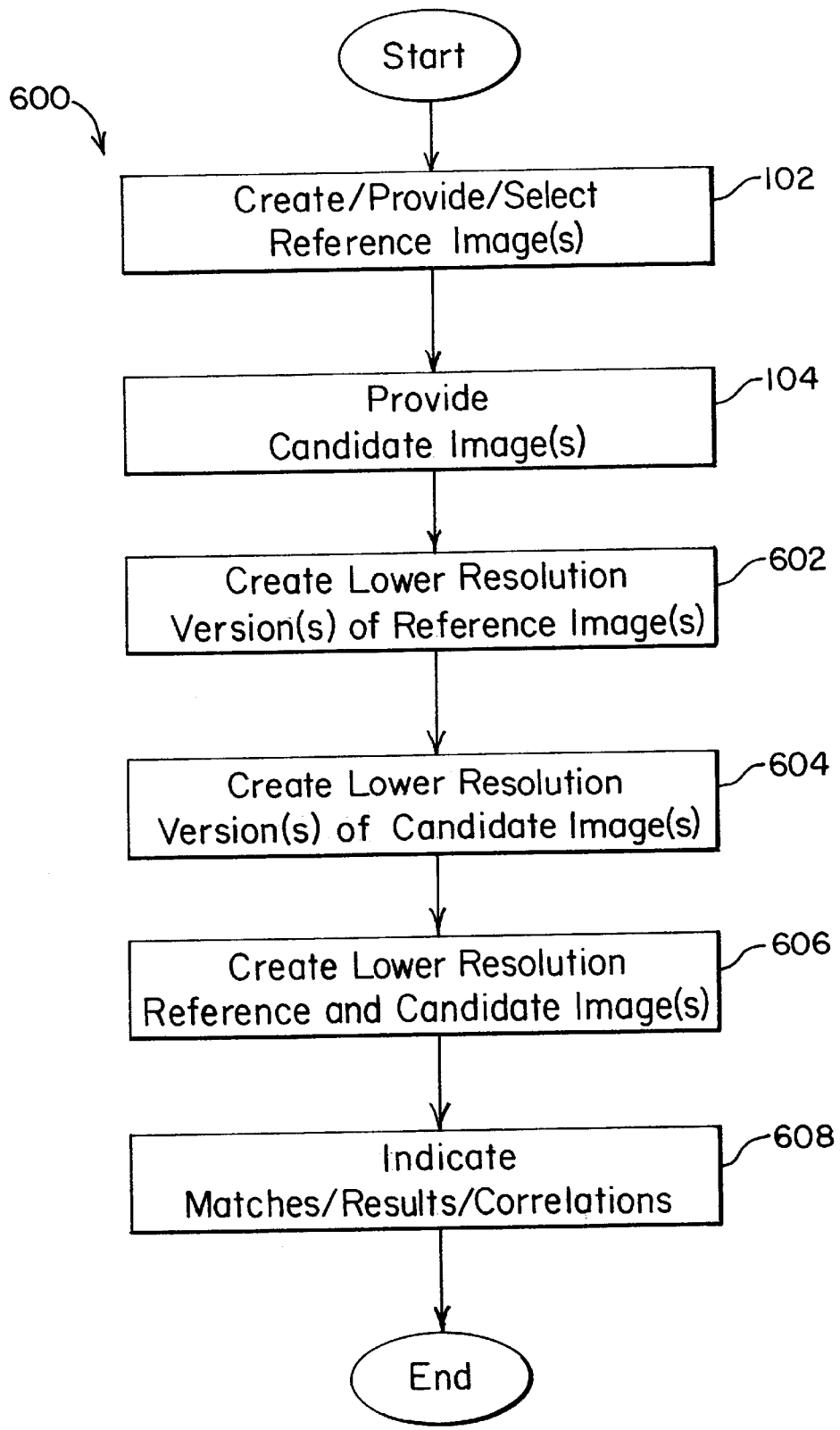
FIG. 13 is a general flowchart of a second embodiment of a method in accordance with the principles of the present invention.

A second embodiment 600 of a method in accordance with the present invention is illustrated in FIG. 13 and includes the steps 102, 104 as previously described above, a step 602 of creating lower resolution versions of the reference image(s) produced during the step 102, a step 604 of creating lower resolution versions of the candidate image(s) produced during the step 104, a step 606 of comparing the lower resolution versions of the reference images and the lower resolution versions of the candidate images, and a step 608 of indicating or providing the matches, results, or correlations determined during the step 606. The step 602 can be completed as part of the step 102 or during or before the completion of the step 104. The step 604 can be completed as part of the step 104 or as part of or before the step 602. Each of the steps 602, 604, 606, 608 will be discussed in further detail below.

One advantage of the method 600 over the method 100 is that comparisons of one or more reference images with one or more candidate images during the step 606 can be done in hardware or software, i.e., without using optical correlation, while still maintaining a high rate of comparisons between images. By creating lower resolution versions of the reference images during the step 602 and lower resolution versions of the candidate images during the step 604, the comparisons conducted during the step 606 between the lower resolution reference images and lower resolution candidate images can be done efficiently in hardware and/or software, as will be discussed in more detail below. In addition, comparison of lower resolution versions increases the ability to compare video or film streams or other sequences of images more efficiently and quickly.

After one or more reference images are produced during the step 102, the lower resolution versions of the reference images can be created in a variety of ways. Similarly, after one or more candidate images are produced during the step 104, the lower resolution versions of the candidate images can also be created in a variety of ways. For example, pixels could be averaged together using software or a faster electronic circuit.

Figure 14:
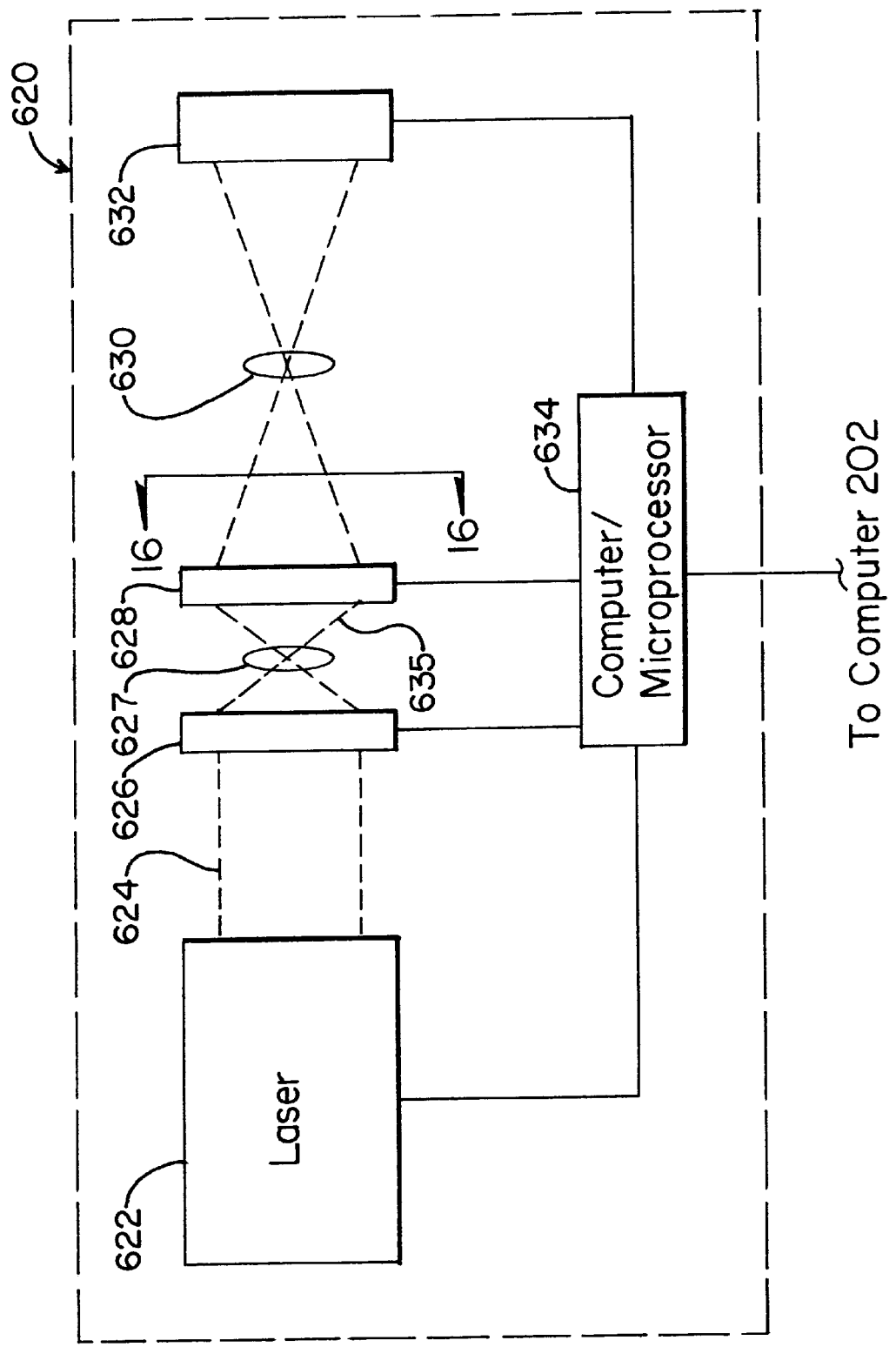
FIG. 14 is a block diagram of a representative optical system using a spatial light modulator that can be used with the method of FIG. 13.

For the method 600, lower resolution versions of the reference images are preferably created during the step 602 and lower resolution versions of the candidate images are preferably created during the step 604 such that they are still useful for image or pattern matching or comparison. An optical system, such as the optical system 620 illustrated in FIG. 14, can be used for such purposes. The optical system 620 may form part of the optical correlation system 220 or the computer 202 previously described above or the optical system 620 may be a separate and distinct component locally or remotely connected to either the optical correlation system 220 or the computer 202.

The optical system 620 preferably includes a laser or other light source 622 which produces a coherent laser or light beam 624. The laser or light source 622 can be identical to the laser or light source 254 previously described above. The light beam 624 shines on, passes through, or reflects off of the spatial light modulator 626. A lens, 627, focuses the image from the spatial light modulator 626 onto a programmable or other controllable filter, mask, or spatial light modulator 628 before passing through the Fourier transform lens 630 and reaching the CCD camera, detector, array, photodiode or other device 632. A computer, microprocessor, or other controller 634 preferably controls the operation of some are all of the laser 622, the spatial light modulator 626, the filter, mask, or spatial light modulator 628, and the device 632, as will be discussed in further detail below.

Figure 15:
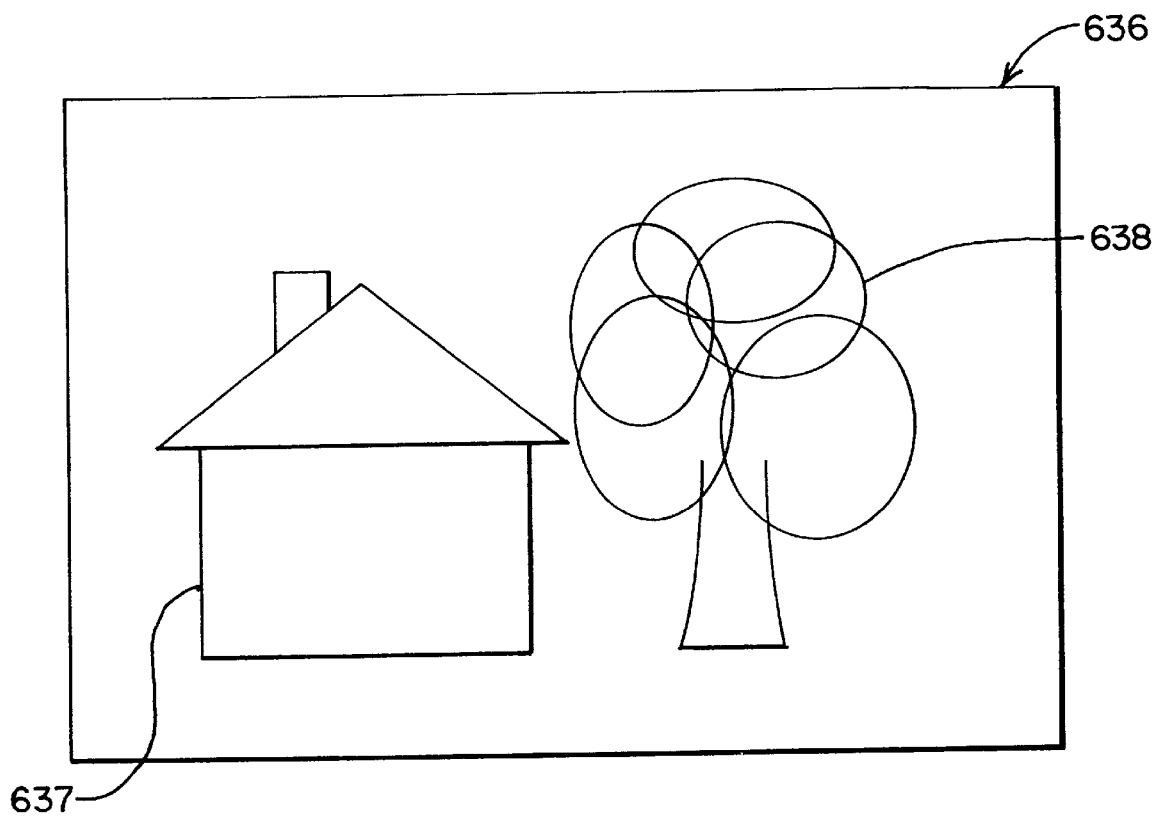
FIG. 15 is a representative reference image that can be used with the optical system of FIG. 14.

The filter, mask, or spatial light modulator 628 can block some or all of the light or laser beam 635 from further passing or propagating through the Fourier transform lens 630, thereby blocking or otherwise preventing some of the light passing through the image created on the spatial light modulator 626 from reaching the lens 630. For example, suppose a reference or candidate image, such as an image 636 in FIG. 15, is created by the spatial light modulator 626. The image 636 contains two basic elements, namely the house 637 and the tree 638. Note that the spatial light modulator 626 forming the image 636 in FIG. 15 is larger than its representation in FIG. 14 for purposes of explanation.

Figure 16:
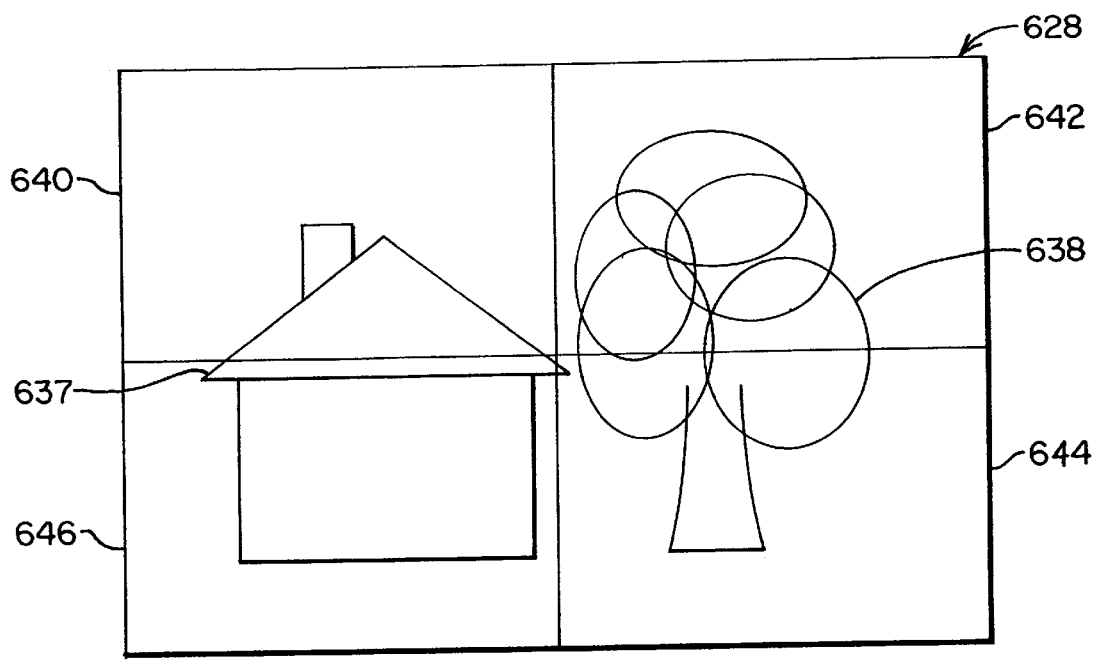
FIG. 16 is an enlarged representative view of the mask and an image formed by the spatial light modulator of FIG. 15, taken along the line 16—16 of FIG. 14.
Figure 17:
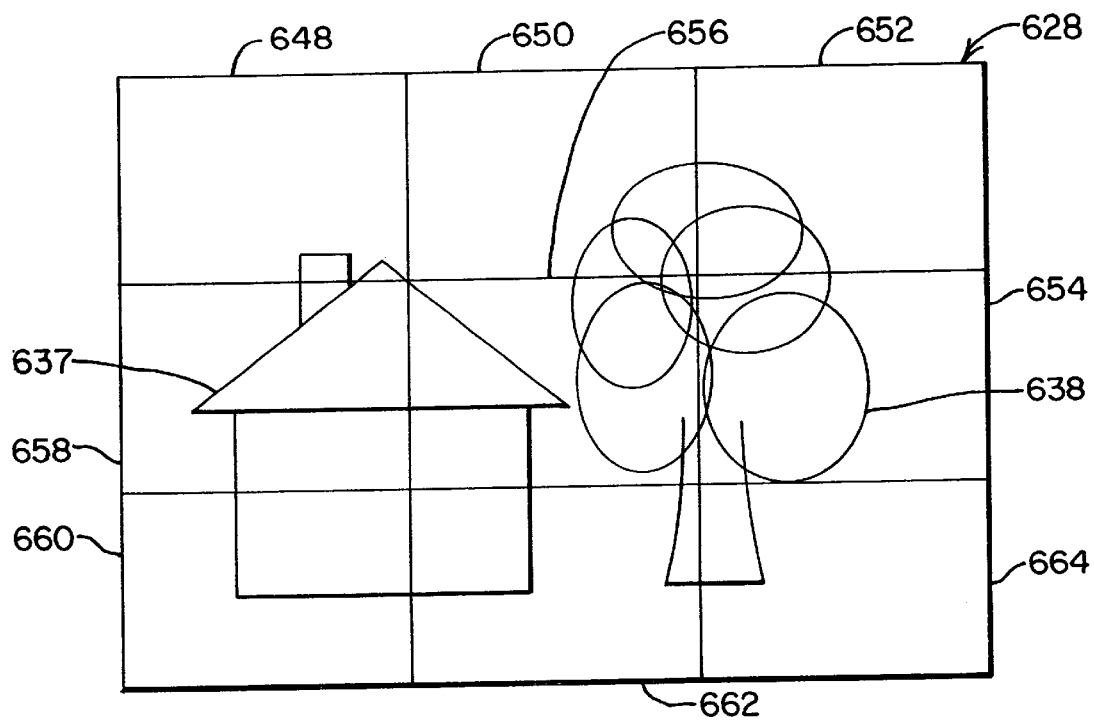
FIG. 17 is another enlarged representative view of the mask and an image formed by the spatial light modulator of FIG. 15, also taken along the line 16—16 of FIG. 14.

The mask 628 may form a grid or other pattern of blocks or cells that can be individually controlled so that selected areas of light from the laser or light source 622 pass or propagate through the mask 628 after passing or propagating through the spatial light modulator 626. That is, the mask 628 controls how much or which parts of the light beam 635 are allowed to pass though the mask 628 by controlling the transmissibility or transparency of the individual cells or blocks in the mask 628. For example, the filter or mask 628 may form a set of four independently controlled blocks or cells 640, 642, 644, 646, such as illustrated in FIG. 16. The blocks or cells 640, 642, 644, 646 formed by the controllable mask 628 are individually controllable such that selected portions of the image 636 are viewable when viewing the image 636 through the mask 628. The mask or filter 628 may have any number of blocks or cells, and the blocks or cells may be of triangular, square, rectangular, pentagonal, hexagonal, or other shape. For example, the mask 628 may have nine cells 648, 650, 652, 654, 656, 658, 660, 662, 664, as illustrated in FIG. 17.

Figure 18:
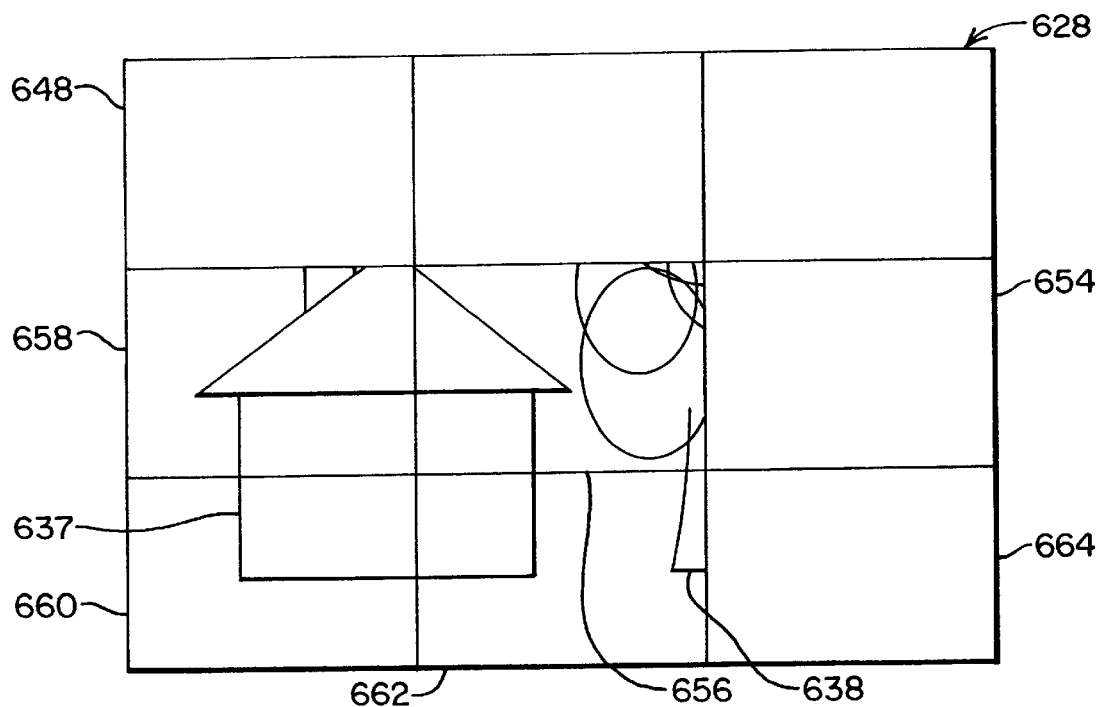
FIG. 18 is a representative view of the mask and image of FIG. 17 when selected cells of the mask are set to prevent light from passing through them.
Figure 19:
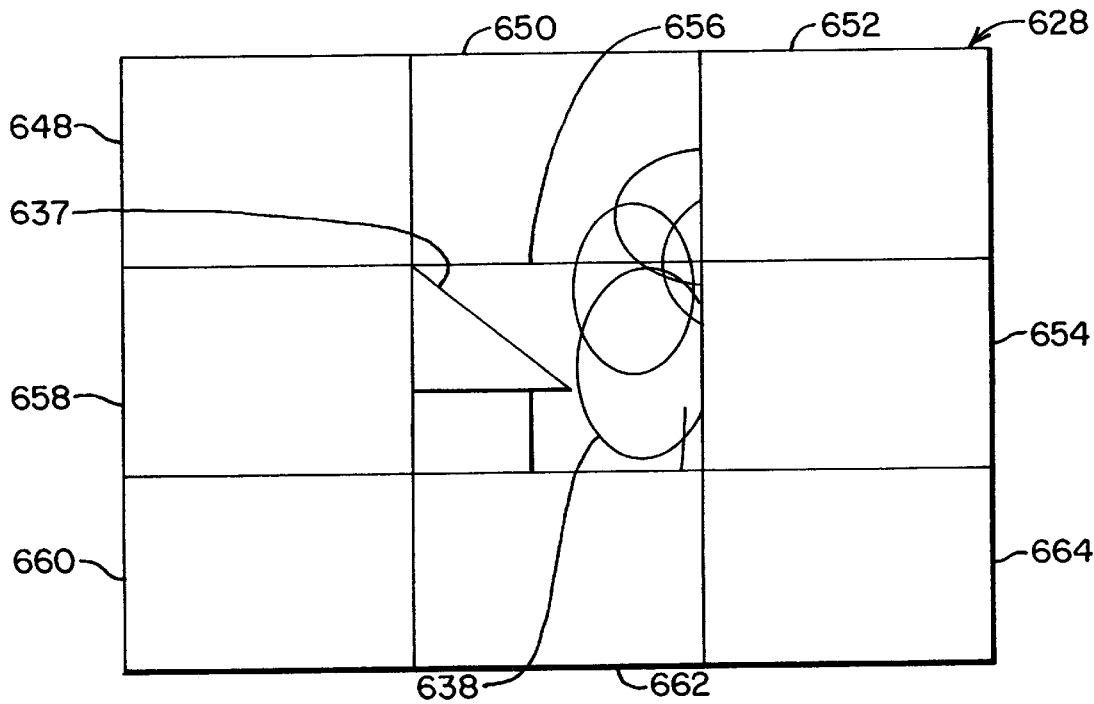
FIG. 19 is another representative view of the mask and image of FIG. 17 when selected cells of the mask are set to prevent light from passing through them.

As previously described above, the transparency or transmissibility of the blocks or cells of or in the mask 628 are preferably individually controllable so that only selected portions of the image 636 are visible when viewing the image 636 or spatial light modulator 626 through the mask 628 and so that only selected portions or areas of the laser or light beam 639 passes through the mask 628 and reaches the lens 630. For example, suppose the mask 628 includes the nine blocks or cells 648, 650, 652, 654, 656, 658, 660, 662, 664 illustrated in FIG. 17. By setting the transparency of the cells 648, 650, 652, 654, 664 such that no light can pass through them, only the portions of the house 637 and the tree 638 falling within the cells 656, 658, 660, 662 are viewable when looking through the mask 628 toward the spatial light modulator 626, as illustrated in FIG. 18, and only the portions of the laser or light beam 635 passing or propagating through the cells 656, 658, 660, 662 will not be blocked or otherwise prevented by the mask 628 from reaching the lens 630. Alternatively, by setting the transparency of the cells 648, 652, 654,658, 660, 662, 664 such that no light can pass through them, only the portions of the house 637 and the tree 638 falling within the cells 650, 656 are viewable when looking through the mask 628 toward the spatial light modulation 626, as illustrated in FIG. 19, and only the portions of the laser or light beam 635 passing or propagating through the cells 650, 656 will not be blocked by the mask 628 from reaching the lens 630.

The mask 628 can be used when creating a lower resolution image of a reference or a candidate image during the steps 602, 604, respectively, or to aid in the comparison of the lower resolution versions of the reference and candidate image during the step 606. For example, suppose that a user is only interested in candidate images that have a certain structure, texture, shape, color, etc. in the top right or top right corner of the candidate images. By selectively blocking out selected or certain cells or areas of the mask 628, i.e., making the selected cells have no or little transparency or transmissibility, only structure, texture, shape, color, etc. in the appropriate or desired areas only the areas of interest of the candidate image(s) are compared to the reference image (s). In addition, a user can use the blocking or masking capability provided by the mask 628 to allow only selected portions of one or more reference images to be compared to all or selected portions of one or more candidate images to increase the accuracy and precision of the comparison during the step 606 or to allow the user to search for only selected features of one or more reference images.

Regardless of whether the filter, mask, or spatial light modulator 628 is used in the optical system 620, the device 632 can be used to create a low resolution version of an image created by the spatial light modulator 626. For example, suppose the spatial light modulator 626 has a rectangular array of pixels with a resolution of eight hundred pixels by six hundred pixels, for a total of 480,000 pixels. In contrast, the device 632 might have a rectangular array of pixels, sensors, photodiodes, or detectors with only a resolution of four hundred pixels by three hundred pixels, for a total of 120,000 pixels, sensors, or detectors. Thus, a pixel on the device 632 will, in general, represent four pixels on the spatial light modulator 626. Therefore, in such an application, the device 632 will have one-fourth the resolution of the spatial light modulator 626.

Figure 20:
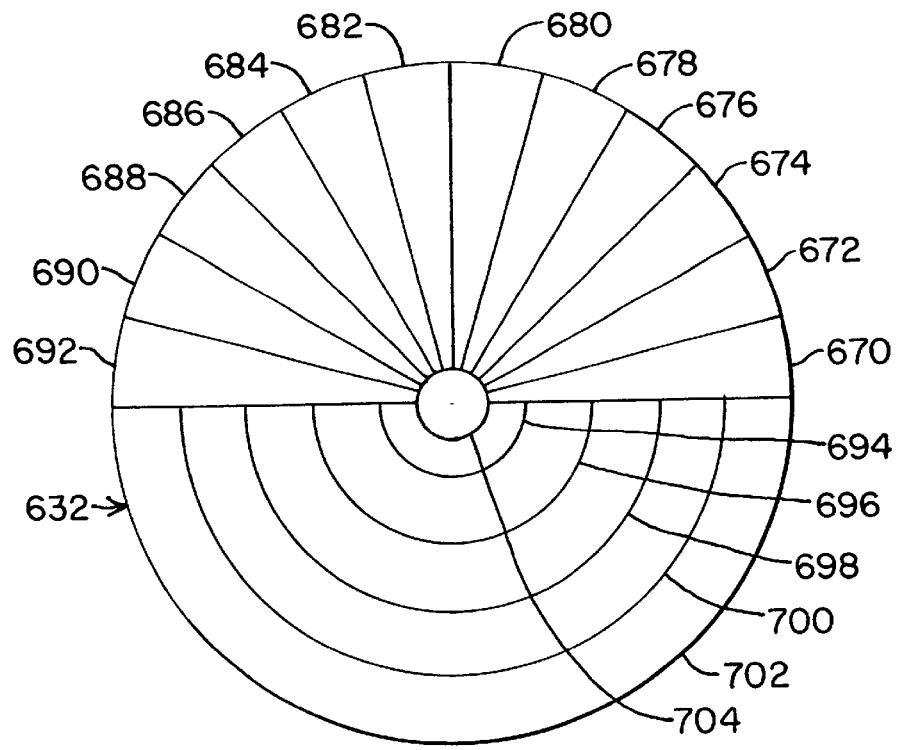
FIG. 20 is a configuration of pixels, sensors, photodiodes or detectors of the CCD or photodiode device used with the optical system of FIG. 14.

In a preferred embodiment of the detector 632, the detector 632 may have its pixels, sensors, photodiodes, or detectors arranged in a non-rectangular fashion, such as illustrated in FIG. 20. In the detector 632 illustrated in FIG. 20, lines or groups 670, 672, 674, 676, 678, 680, 682, 684, 686, 688, 690, 692, 694, 696, 698, 700, 702, 704 of one or more pixels, sensors, photodiodes, or detectors are arranged in specific patterns which fill the area of the detector. The lines, groups or pie-shapes 670, 672, 674, 676, 678, 680, 682, 684, 686, 688, 690, 692, or pixels, sensors, photodiodes, or detectors serve as rotation detectors and are size invariant. Thus, the lines, groups, or pie-shapes 670, 672, 674, 676, 678, 680, 682, 684, 686, 688, 690, 692, of one or more pixels, sensors, photodiodes or detectors in the detector 632 detect whether structure in or components of an image formed or created by the spatial light modulator 626 is/are rotated regardless of the size or scale of the structure in or components of the image. In contrast, the lines, groups, or half-rings 694, 696, 698, 700, 702 of one or more pixels, sensors, photodiodes or detectors in the detector 632 serve as size or scale detectors and are rotation invariant. That is, the lines, groups, or half-rings 694, 696, 698, 700, 702 of one or more pixels, sensors, photodiodes, or detectors in the detector 632 detect the scale or size of structure or components of an image formed by the spatial light modulator 626 regardless of the rotation of such structure or components in the image. The one or more pixels, sensors, photodiodes, or detectors in the center 704 provide the average intensity or DC term for the detector 632 which can be used to measure, detect, or determine average color or average brightness without requiring any form of pixel averaging. In addition, the center 704 can be used to normalize other readings from other devices or detectors.

The configuration of the device 632 illustrated in FIG. 20 generates a lower resolution of a reference, candidate, or any other image formed on the spatial light modulator 626. That is, each pixel, sensor, photodiode or detector located in the lines or groups 670, 672, 674, 676, 678, 680, 682, 684, 686, 688, 690, 692, 694, 696, 698, 700, 702, 704 of pixels, sensors, photodiodes or detectors preferably detects light falling on it and generates or creates a number or value within a limited range or scale, such as a range between zero and 255. All of the numbers or values generated by all of the pixels, sensors, or detectors for a particular reference or candidate image can be appended or sequenced in any order into a string of numbers. The numbers can be formed into a string by either the device 632 or the computer or controller 634. The string of numbers can then be stored or saved in the computer 634 or transmitted to another computer or client device, such as the computer 264, the controller 202, or the client device 202.

During the step 602, a lower resolution version of a reference image can be created using the optical system 620 such that a string of numbers is produced. Similarly, during the step 604, a lower resolution version of a candidate image can be created using the optical system 620 such that a string of numbers is produced. So long as the device 632 is configured in the same way, or so long as the lower resolution versions of the reference image and the candidate image are created or generated in the same way, such lower resolution versions of the reference image and the candidate image can be compared during the step 606 by comparing their associated strings of numbers. Thus, many different techniques and/or configurations of the optical system 620 can be used to generate the lower resolution versions of reference images and candidate images and the method 600 should not be limited to any specific or particular technique, configuration, or apparatus.

During the step 606, a string of numbers representing a reference image can be compared to a string of numbers representing a candidate image in many different ways. For example, the differences between corresponding numbers in the two strings of numbers can be compared and their difference determined. A total can be computed of the absolute values of all of the differences between corresponding numbers in the two strings of numbers. The higher the total, the greater the difference between the string of numbers representing the reference image and the string of numbers representing the candidate image and, as a result, the greater the difference between the reference image and the candidate image. In contrast, the lower the total, the smaller the difference between the string of numbers representing the reference image and the string of numbers representing the candidate image and, as a result, the smaller the difference between the reference image and the candidate image. Preferably, but not necessarily, if the total is less than or equal to some pre-set or predetermined threshold or value, the reference image and the candidate image will be considered to be similar in some fashion and such result can be indicated to the user and/or the computer 634 during the step 608 and they may optionally be compared using optical correlation as previously described above. The threshold or value may be fixed or predetermined or the threshold of value may be allowed to change or float dynamically such that the rate of comparisons of reference images and candidate images using optical correlation increases or decreases in some desired, programmed, or pre-set manner. A more computationally intense method of comparison would be to perform a true digital correlation of the two strings of numbers and to output a correlation metric.

The mask, filter, or spatial light modulator 628 can be used to create a longer and more detailed string of numbers representing the lower resolution version of a reference or candidate image. For example, if the image 636 from FIG. 15 and the nine cell mask 628 from FIG. 17 are used, the cells 648, 650, 652, 654, 656. 658, 660, 662, 664 can be individually activated in any sequence such that nine different portions of the image 636 are detected by the detector 632. The string of numbers for each portion of the nine portions of the image 636 can be appended together or otherwise used to create a longer string of numbers that can be compared as previously described above to a string of numbers for a candidate image created in the same manner. In addition, specific portions of a string of numbers representing a specific portion of a reference image and a specific portion of a candidate image can also be compared without comparing the entire strings of numbers representing the reference image and the candidate image.

Figure 21:
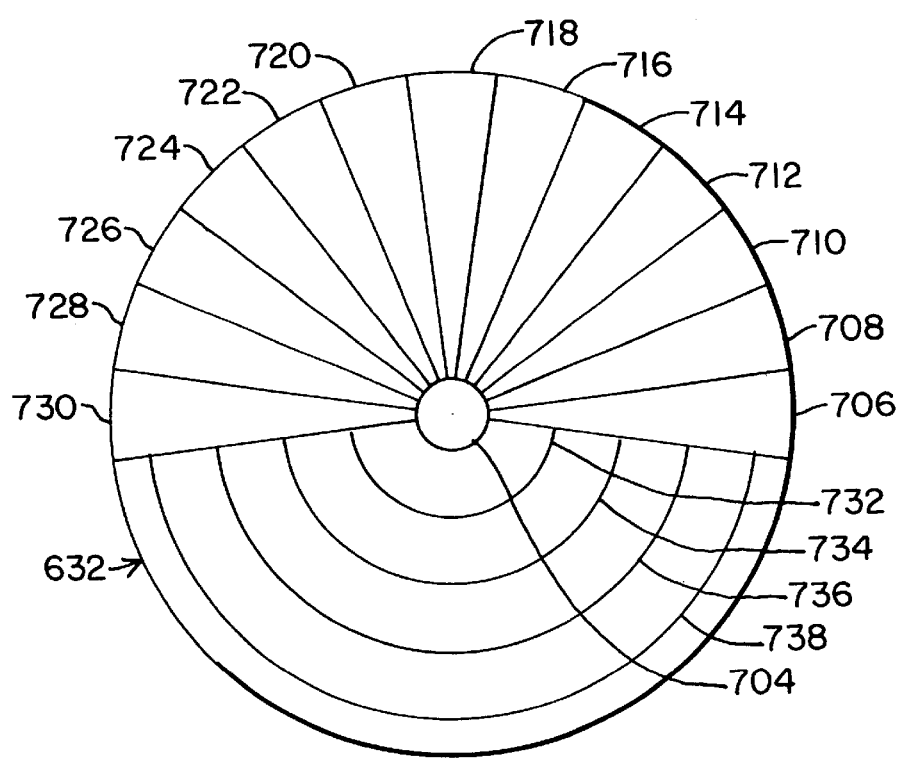
FIG. 21 is another configuration of pixels, sensors, photodiodes, or detectors of the CCD or photodiode device used with the optical system of FIG. 14.

The device 632 may have many different arrangements of pixels, sensors, photodiodes, or detectors so that the device 632 is sensitive to different shapes, sizes, etc. of interest. The device 632 may also be configured as illustrated in FIG. 21. The device 632 may also be configured as a superposition of the elements as configured in FIGS. 20 and 21. The device 632 illustrated in FIG. 21 includes the pie-shaped areas 706, 708, 710, 712, 714, 716, 718, 720, 722, 724, 726, 728 and 730, each of which may contain or comprise one or more sensors, photodiodes, CCD elements or other detectors. In addition, the detector 632 illustrated in FIG. 21 includes the half-ring or arc areas 732, 734, 736, and 738, each of which may contain or comprise one or more sensors, photodiodes, CCD elements, or other detectors.

In addition to comparing lower resolution versions of one or more reference images with one or more candidate images during the step 606, candidate images that are considered to be similar to a reference image after comparison during the step can be further compared using optical correlation or the optical correlation system 220 previously described above. That is, for candidate images that are considered to be similar to a reference image after comparison during the step 606, the reference image and the candidate images, or their lower resolution versions, can be compared using the optical correlation system 220 during a step 108 as previously described above. Therefore, some or all of the steps 602, 604, 606 can be used to pre-process, pre-select, or filter candidate images without using optical correlation or the optical correlation system 220 to find the best candidate images which can then be compared during the step 108 using optical correlation or the optical correlation system 220. Therefore, in such a situation, some or all of the steps 602, 604, 606 could be inserted or used between, or combined with, the steps 104 and 106 in the method 100 illustrated in FIG. 1. Some of all of the steps of the method 600 can also be used or combined steps in the methods 400 and 500 previously described above.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow.

The computer network 208 and the network apparatus 200 illustrated in FIG. 2 are only meant to be generally representative of computer, cable, or data communication networks for purposes of elaboration and explanation of the present invention and other devices, networks, etc. may be connected to the computer network 208 without departing from the scope of the present invention. The computer network 208 is also intended to be representative of, and include all or a part of, the Internet, the World Wide Web, and other privately or publicly operated networks. The computer network 208 can also include other public and/or private wide area networks, local area networks, data communication networks or connections, intranets, routers, gateways, satellite links, microwave links, cable connections, cellular or radio links, fiber optic transmission lines, ISDN lines, T1 lines, etc. In addition, as used herein, the terms "computer," "controller," "terminal," and "client" are generally interchangeable and are meant to be construed broadly and to include, but not be limited to, all clients, client devices or machines, terminals, computers, processors, servers, etc. connected or connectable to a computer or data communications network and all devices on which Internet-enabled software, such as the Netscape Communicator™ or Navigator™ browsers, the Mosiac™ browser, or the Microsoft Internet Explorer™ browser, can operate or be run. The term "browser" should also be interpreted as including Internet-enabled software and computer or client software that enables or allows communication over a computer network and Internet-enabled, monitored, or controlled devices such as WebTV, household appliances, phones, etc.

Each of the methods described above can be performed on a single computer, computer system, microprocessor, etc. or by a single software application. In addition, two or more of the steps in each of the methods described above could be performed on two or more different computers, computer systems, software applications, microprocessors, specifically designed chips or circuits, etc., some or all of which may be locally or remotely configured or operated. The methods can be implemented in any sort or implementation of computer software, program, sets of instructions, or code, such software, programs, sets of instructions, or code being storable, writable, or savable on any computer usable media or other program storage device or media such as a floppy or other magnetic or optical disk, magnetic or optical tape, CD-ROM, hard disk drive, zip disk, flash or optical memory card, microprocessor, ASIC, solid state memory device, RAM or ROM chip(s), PROM or EPROM device, etc. The methods may also use electrically or electronically addressed spatial light modulators or optically addressed spatial light modulators and many different kinds of optical correlation systems.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A search method for locating particular content or similar content that has been converted to a digital format for storage in a digital file at a location somewhere in at least one of a plurality of database and/or server devices, which are connected to and accessible via a computer network, comprising:

producing a reference image in an optical pattern that is characteristic of the particular content;

accessing and downloading a plurality of digital candidate files from their respective storage locations in one or more of the plurality of database and/or server devices along with location information that is indicative of said respective storage locations;

producing a plurality of candidate images in optical patterns that are characteristic of content in the respective downloaded digital candidate files;

comparing the candidate images to the reference image by optical correlation to detect degree of correlation between the reference image and the candidate images; and reporting results based on the degree of correlation for the digital candidate files from the storage locations that are determined by the degree of correlation to have content that is closest to or matches the particular content.

2. The method of claim 1, including retrieving or downloading one or more digital candidate files from one or more web sites connected to the World Wide Web.

3. The method of claim 1, including retrieving or downloading one or more digital candidate files from a decentralized database or depository in which it is desired to search for the particular content.

4. The method of claim 1, wherein comparing the candidate images to the reference image using optical correlation includes programming at least one spatial light modulator to represent the reference image.

5. The method of claim 4, wherein comparing the candidate images with the reference image using optical correlation includes programming at least one spatial light modulator to represent respective candidate images in order to compare such respective candidate images optically with the reference image.

6. The method of claim 1, including conducting a text or keyword search to locate one or more web sites that might contain the particular content of interest.

7. The method of claim 6, including retrieving or downloading one or more digital candidate files from one or more of said web sites.

8. The method of claim 1, including:
  producing the reference image on a client device that is connected to a optical correlation system;
  transmitting the reference image from said client device to the optical correlation system for producing the optical pattern that is characteristic of the particular content;
  producing the candidate images on the client device and transmitting the candidate images to the optical correlation system for producing the optical patterns that are characteristic of the content in the respective downloaded digital candidate files;
  comparing the optical patterns produced from the respective candidate images to the optical pattern produced from the reference image by optical correlation in the optical correlation system; and
  reporting the degree of correlation and/or candidate images that have a higher degree of correlation than other candidate images on the client device.

9. The method of claim 1, including:
  downloading digital files from a plurality of database and/or server devices and web sites at divers locations via the computer network; and
  selecting candidate images from among such downloaded digital files for populating a database of candidate images from which said one or more candidate images can be accessed for subsequent comparison to one or more reference images.

10. The method of claim 1, including rescaling or resizing one or more of said candidate images prior to said comparison of said reference image with said candidate images.

11. The method of claim 1, wherein said comparing of said reference image with said candidate images using optical correlation is rotationally and/or size invariant.

12. The method of claim 1, wherein said producing the reference image include creating a new image.

13. The method of claim 1, wherein said producing reference image includes input of one or more previously created images.

14. The method of claim 1, wherein said producing reference image includes selecting from one or more previously created images.

15. The method of claim 1, including creating a lower resolution optical version of the reference image and a lower resolution optical version of at least one of the candidate images.

16. The method of claim 15, including comparing said lower resolution version of the reference image and said lower resolution version of said at least one candidate image.

17. The method of claim 16, wherein said comparing said reference image with one or more of said candidate images using optical correlation is limited to the reference image and candidate images for which at least a threshold level of similarity is determined as a result of said comparing said lower resolution version of the reference image and said lower resolution version of said at least one candidate image.

18. The method of claim 1, wherein the particular content includes a visual image.

19. The method of claim 18, including producing the candidate images in optical display patterns from downloaded digital candidate files of visual image content.

20. The method of claim 19, wherein a downloaded digital candidate file was produced from a visual image by a graphic digital format, and the method includes using such graphic digital format to produce the candidate image from that downloaded digital candidate file.

21. The method of claim 18, wherein reporting the results includes showing the candidate images that are closest in degree of correlation to the reference image.

22. The method of claim 1, wherein the particular content includes music or sound.

23. The method of claim 22, including:
  producing the reference image by converting a reference sound into a digital format according to a particular sound-to-digital format and then applying an algorithm to convert the digital format to the reference image; and
  producing the candidate images by applying the algorithm to sound content in the digital candidate files that has also been converted into digital format according to said particular sound-to-digital format.

24. The method of claim 23, wherein the algorithm includes mapping each data byte of sound content in the digital format to a pixel location on an optical correlator input device.

25. The method of claim 1, wherein the particular content includes text, which as been converted to digital format for storage.

26. The method of claim 25, including:
  producing the reference image by converting reference text into a digital format according to a particular text-to-digital format and then applying an algorithm to convert the digital format to the reference image; and
  producing the candidate images by applying the same algorithm to text in the digital candidate files that has also been converted into digital format according to said particular text-to-digital format.

27. The method of claim 26, wherein the algorithm includes mapping each data byte of text content in the digital format to a pixel location on an optical correlator input device.

28. The method of claim 1, wherein the particular content includes software.

29. The method fo claim 1, including searching for candidate images at URLs on the World Wide Web.

30. The method of claim 29, including:

downloading HTML files from web sites;

searching the HTML files for files in graphics digital format; and utilizing such graphics digital files as candidate image files.

31. The method of claim 1, including performing a focus search to determine locations of databases, web sites, and/or servers that are more likely to contain the particular content than random searching, and then accessing and downloading digital candidate files from such databases, web sites, and/or servers.

32. The method of claim 1, including storing retrieved digital candidate files in a central database for subsequent use in producing candidate images for comparison to reference images.

33. The method of claim 32, including queuing digital candidate files from the central abase for use in producing the candidate images for comparison to the reference image.

34. The method of claim 1, including modifying one or more of the candidate images by blocking some content of such candidate image prior to comparison to the reference image.

35. A search method for locating a digital file of particular content or similar content stored at a location in at least one of a plurality of database and/or server devices connected to and accessible via a computer network, comprising:

producing at least one reference image in an optical pattern that is characteristic of the particular content or similar content;

accessing and downloading a plurality of digital candidate files from their respective storage locations in one or more of the plurality of database and/or server devices;

producing a plurality of candidate images in optical patterns that are characteristic of content in the respective downloaded digital candidate files;

comparing features of the optical pattern of the reference image that is characteristic of the particular content or similar content with features of the optical patterns of the respective candidate images that are characteristic of content in their respective downloaded digital candidate files to find and report matches of such reference image with one or more of the candidate images and thereby identify and/or locate a digital file of the particular content or similar content.

36. The search method of claim 35, wherein the optical pattern of the reference image and the optical patterns of the candidate images include visual images.

37. The search method of claim 35, wherein the optical pattern of the reference image and the optical patterns of the candidate images include Fourier transforms of visual images.

38. The search method of claim 35, including acquiring location information that is indicative of the respective storage locations of the digital candidate files in association with the candidate images.

39. The search method of claim 38, wherein such location information includes Uniform Resource Locators (URLs) of respective web sites from where the digital candidate files were accessed and downloaded.

40. The method of claim 35, including conducting a keyword or text search to find one or more web sites likely to contain one or more candidate images of interest.

41. The method of claim 35, including populating a database of images with one or more of said candidate images.

42. The method of claim 35, including forming a queue of one or more of said candidate images that are to be compared with one or more of said reference images.

43. The method of claim 35, wherein said retrieving or downloading one or more of said candidate images from one or more web sites includes retrieving or downloading in parallel a plurality of said candidate images from one or more web sites.

44. The method of claim 43, including forming a queue of one or more of said candidate images that are to be compared with one or more of said reference images.

45. The method of claim 35, wherein said producing one or more reference images includes converting content of one or more software files into said one or more reference images.

46. The method of claim 35, wherein said producing one or more reference images includes converting content of one or more sound or music files into said one or more reference images.

47. The method of claim 35, wherein said producing one or more reference images includes converting content of one or more text files into said one or more reference images.

48. The method of claim 35, wherein said comparing one or more candidate images with one or more reference images includes creating a lower resolution version of at least one candidate image and a lower resolution version of at least one reference image.

49. The method of claim 48, wherein said comparing one or more candidate images with one or more reference images includes comparing said lower resolution version of said at least one candidate image with said lower resolution version of said at least one reference image.

50. The method of claim 35, including creating a lower resolution version of at least one candidate image and a lower resolution version of at least one reference image.

51. The method of claim 50, including creating a lower resolution version of said at least one candidate image and a lower resolution version of at least one reference image.

52. The method of claim 51, wherein said comparing one or more candidate images with one or more reference images includes comparing said one or more candidate images with said one or more reference images via optical correlation.

53. The method of claim 35, wherein said comparing one or more indidate images with one or more reference images includes comparing said one or more candidate images with said one or more reference images via optical correlation.

54. The method of claim 35, wherein said comparing one or more candidate images with one or more reference images includes Fourier transforming said one or more candidate images and said one or more reference images.

55. The method of claim 35, wherein said comparing one or more candidate images with one or more reference images includes correlating or comparing a Fourier transformed version of a reference image with a Fourier transformed version of a candidate image.

56. Search apparatus for locating a digital file of particular content or similar content stored at a location in at least one of a plurality of database and/or server devices connected to and accessible via a computer network, comprising:

reference image producing means for producing at least one reference image in an optical pattern that is characteristic of the particular content or similar content;

candidate file access means connectable to the computer network for accessing and downloading a plurality of digital candidate files from their respective storage locations in one or more of the plurality of database and/or server devices;

candidate image producing means connectable to the candidate file access means for converting digital candidate files to candidate images in optical patterns that are characteristic of content in the respective downloaded digital candidate files; and optical comparing means for comparing the optical pattern of the reference image with the optical patterns of the respective candidate images in order to determine, by matching a candidate image optical pattern to the reference image optical pattern, whether any of the candidate digital files from any of the respective storage locations has the particular content or similar content.

57. The search apparatus of claim 56, wherein the candidate image producing means capable of converting digital candidate files of visual image content to candidate images in optical patterns that are characteristic of the visual image content in the respective digital candidate files.

58. The search apparatus of claim 56, wherein the candidate image producing means capable fo converting digital candidate files of music or sound content to candidate images in optical patterns that are characteristic of the music or sound content in the respective digital candidate files.

59. The search apparatus of claim 56, wherein the candidate image producing means capable of converting digital candidate files of text content to candidate images in optical patterns that are characteristic of the text content in the respective digital candidate files.

60. The search apparatus of claim 56, wherein the candidate image producing mean is capable of converting digital candidate files of software content to candidate images in optical patterns that are characteristic of the software content in the respective digital candidate files.

61. The search apparatus of claim 56, including reporting means connected to the optical comparing means for reporting matches of candidate image optical patterns to the reference image optical pattern along with information indicative of locations where the digital candidate files that were converted to the matching candidate images were accessed.

62. The search apparatus of claim 61, wherein the location information includes URLs of web sites where such digital candidate files were accessed.

63. The search apparatus of claim 61, wherein th optical comparing means includes optical correlator apparatus connected to the reference image producing means, to the candidate image producing means, and to the reporting means.

64. The search apparatus of claim 63, including a client device that comprises the reference image producing means, the candidate image producing means, and the reporting means.

65. The apparatus of claim 56, wherein said candidate file access means includes means for retrieving or downloading one or more of said digital candidate files from one or more web sites.

66. The apparatus of claim 56, wherein said candidate file access means includes search means for searching one or more web sites to find one or more of said digital candidate files.

* * * * *